(12) United States Patent
Atsuumi et al.

(10) Patent No.: US 8,649,108 B2
(45) Date of Patent: Feb. 11, 2014

(54) ZOOM LENS, CAMERA DEVICE, AND DATA TERMINAL DEVICE

(75) Inventors: Hiromichi Atsuumi, Yokohama (JP); Yohei Takano, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 35 days.

(21) Appl. No.: 13/419,747

(22) Filed: Mar. 14, 2012

(65) Prior Publication Data
US 2012/0236419 A1    Sep. 20, 2012

(30) Foreign Application Priority Data
Mar. 15, 2011    (JP) ................................. 2011-057263

(51) Int. Cl.
*G02B 15/14*    (2006.01)

(52) U.S. Cl.
USPC ........................................................ 359/684

(58) Field of Classification Search
USPC .......... 359/745, 754, 763–765, 676, 680, 682
See application file for complete search history.

(56) References Cited

U.S. PATENT DOCUMENTS

| | | | | |
|---|---|---|---|---|
| 5,499,141 | A | * | 3/1996 | Ohtake ......................... 359/684 |
| 5,898,525 | A | * | 4/1999 | Suzuki .......................... 359/684 |
| 6,236,516 | B1 | | 5/2001 | Misaka |
| 6,285,501 | B1 | * | 9/2001 | Suzuki .......................... 359/554 |
| 6,448,998 | B1 | | 9/2002 | Suzuki et al. |
| 6,509,995 | B1 | | 1/2003 | Suzuki et al. |
| 6,606,179 | B2 | | 8/2003 | Suzuki et al. |
| 6,771,407 | B2 | | 8/2004 | Hayashi et al. |
| 6,781,729 | B2 | | 8/2004 | Suzuki et al. |
| 6,791,729 | B2 | | 9/2004 | Atsuumi et al. |
| 6,801,351 | B2 | | 10/2004 | Suzuki et al. |
| 6,829,104 | B2 | | 12/2004 | Suzuki et al. |
| 6,937,371 | B2 | | 8/2005 | Hayashi et al. |
| 6,961,164 | B2 | | 11/2005 | Atsuumi |
| 7,050,210 | B2 | | 5/2006 | Atsuumi et al. |
| 7,068,407 | B2 | | 6/2006 | Sakai et al. |

(Continued)

FOREIGN PATENT DOCUMENTS

| | | |
|---|---|---|
| JP | 10-48518 | 2/1998 |
| JP | 3716418 | 11/2005 |
| JP | 4401451 | 1/2010 |
| JP | 2011-13650 | 1/2011 |

OTHER PUBLICATIONS

The Extended European Search Report issued Sep. 19, 2012, in Application No. / Patent No. 12159723.1-2217 / 2500760.

*Primary Examiner* — Scott J Sugarman
*Assistant Examiner* — Robert E Tallman
(74) *Attorney, Agent, or Firm* — Oblon, Spivak, McClelland, Maier & Neustadt, L.L.P.

(57) ABSTRACT

A zoom lens includes first to fifth lens groups having positive, negative, negative, positive, and positive refractive powers, respectively, arranged along an optical axis in order from an object side, and an aperture stop disposed between the third and fourth lens groups. When zooming from wide angle end to telephoto end, the zoom lens is moved so that an interval between the first and second lens groups increases, an interval between the second and third lens groups varies, an interval between the third and fourth lens groups decreases, and the third lens group focuses. The second lens group is arranged to have a focal length to satisfy the following condition:

$$0.95 < |f2/\sqrt{(fw*ft)}| < 4.0$$

where f2 is a focal length of the second lens group, fw and ft are focal lengths of the entire zoom lens at wide angle end and at telephoto end, respectively.

9 Claims, 16 Drawing Sheets

(56) References Cited

U.S. PATENT DOCUMENTS

| | | |
|---|---|---|
| 7,126,737 B2 | 10/2006 | Atsuumi et al. |
| 7,154,651 B2 | 12/2006 | Atsuumi et al. |
| 7,164,516 B2 | 1/2007 | Hayashi et al. |
| 7,298,537 B2 | 11/2007 | Hayashi et al. |
| 7,397,591 B2 | 7/2008 | Hayashi et al. |
| 7,616,384 B2 | 11/2009 | Atsuumi |
| 7,636,201 B2 | 12/2009 | Sudoh et al. |
| 7,719,773 B2 | 5/2010 | Atsuumi et al. |
| 7,864,443 B2 | 1/2011 | Sudoh et al. |
| 7,929,071 B2 | 4/2011 | Hirano et al. |
| 7,933,074 B2 | 4/2011 | Takano et al. |
| 8,054,559 B2 | 11/2011 | Takano et al. |
| 2006/0238845 A1 | 10/2006 | Atsuumi et al. |
| 2007/0206261 A1 | 9/2007 | Hayashi et al. |
| 2009/0059335 A1 | 3/2009 | Amada et al. |
| 2010/0007966 A1* | 1/2010 | Katakura ............ 359/684 |
| 2010/0123956 A1* | 5/2010 | Wada ............ 359/683 |
| 2011/0002048 A1 | 1/2011 | Takano et al. |
| 2012/0008216 A1 | 1/2012 | Takano et al. |

* cited by examiner

F-No.=3.66  Y'=13.0  Y'=13.0
WIDE ANGLE END

SPHERICAL ABERRATION   ASTIGMATISM   DISTORTION   COMATIC ABERRATION

F-No.=4.64  Y'=14.3  Y'=14.3
INTERMEDIATE FOCAL LENGTH

SPHERICAL ABERRATION   ASTIGMATISM   DISTORTION   COMATIC ABERRATION

F-No.=5.81  Y'=14.3  Y'=14.3
TELEPHOTO END

SPHERICAL ABERRATION   ASTIGMATISM   DISTORTION   COMATIC ABERRATION

F-No.=3.63  Y'=13.0  Y'=13.0

WIDE ANGLE END

F-No.=4.65  Y'=14.3  Y'=14.3

INTERMEDIATE FOCAL LENGTH

F-No.=5.83  Y'=14.3  Y'=14.3

TELEPHOTO END

F-No.=3.63  Y'=13.0  Y'=13.0

WIDE ANGLE END

SPHERICAL ABERRATION   ASTIGMATISM   DISTORTION   COMATIC ABERRATION

F-No.=4.63  Y'=14.3  Y'=14.3

INTERMEDIATE FOCAL LENGTH

SPHERICAL ABERRATION   ASTIGMATISM   DISTORTION   COMATIC ABERRATION

F-No.=5.86  Y'=14.3  Y'=14.3

TELEPHOTO END

SPHERICAL ABERRATION   ASTIGMATISM   DISTORTION   COMATIC ABERRATION

F-No. 3.62  Y'=13.0  Y'=13.0

WIDE ANGLE END

SPHERICAL ABERRATION   ASTIGMATISM   DISTORTION   COMATIC ABERRATION

F-No.=4.42  Y'=14.3  Y'=14.3

INTERMEDIATE FOCAL LENGTH

SPHERICAL ABERRATION   ASTIGMATISM   DISTORTION   COMATIC ABERRATION

F-No.=5.84  Y'=14.3  Y'=14.3

TELEPHOTO END

SPHERICAL ABERRATION   ASTIGMATISM   DISTORTION   COMATIC ABERRATION

F-No.=3.65  Y'=13.0  Y'=13.0

WIDE ANGLE END

SPHERICAL ABERRATION / ASTIGMATISM / DISTORTION

COMATIC ABERRATION

F-No.=4.70  Y'=14.3  Y'=14.3

INTERMEDIATE FOCAL LENGTH

SPHERICAL ABERRATION / ASTIGMATISM / DISTORTION

COMATIC ABERRATION

F-No.=5.85  Y'=14.3  Y'=14.3

TELEPHOTO END

SPHERICAL ABERRATION / ASTIGMATISM / DISTORTION

COMATIC ABERRATION

WIDE ANGLE END

F-No.=3.66  Y'=12.3  Y'=12.3

SPHERICAL ABERRATION / ASTIGMATISM / DISTORTION / COMATIC ABERRATION

INTERMEDIATE FOCAL LENGTH

F-No.=4.84  Y'=14.3  Y'=14.3

SPHERICAL ABERRATION / ASTIGMATISM / DISTORTION / COMATIC ABERRATION

TELEPHOTO END

F-No.=5.79  Y'=14.3  Y'=14.3

SPHERICAL ABERRATION / ASTIGMATISM / DISTORTION / COMATIC ABERRATION

F-No.=3.66  Y'=12.3  Y'=12.3

WIDE ANGLE END

F-No.=4.81  Y'=14.3  Y'=14.3

INTERMEDIATE FOCAL LENGTH

F-No.=5.84  Y'=14.3  Y'=14.3

TELEPHOTO END

ZOOM LENS, CAMERA DEVICE, AND DATA TERMINAL DEVICE

CROSS REFERENCE TO RELATED APPLICATION

The present application is based on and claims priority from Japanese Patent Application No. 2011-57263, filed on Mar. 15, 2011, the disclosure of which is hereby incorporated by reference in its entirety.

BACKGROUND OF THE INVENTION

1. Field of the Invention

The present invention relates to a zoom lens applicable as an optical system to a digital camera, a camera device and a data terminal device incorporating such a zoom lens.

2. Description of the Related Art

Along with widespread of a digital camera generally including a zoom lens and an autofocus (AF) function, there have been users' strong demands for development of a high performance, compact-size, high-speed autofocus camera.

To downsize the zoom lens, it is necessary to shorten the total length of the zoom lens in use from the lens surface closest to an object to an image plane. To improve AF speed, it is essential to downsize a focus lens.

To improve the performance of the zoom lens for a high-end digital camera, it is necessary to exert resolution in the entire zoom range to be able to deal with an image sensor with at least 5 to 10 million pixels. A known zoom lens with high magnification includes first to fifth lens groups having positive, negative, negative, positive, and positive focal lengths in this order from an object side, respectively.

Japanese Patent No. 4401451 (Reference 1) and No. 3716418 (Reference 2), for example, disclose such a zoom lens made of the five lens groups. In the zoom lens in Reference 1, the third lens group is a focus lens made of a cemented lens of positive and negative lenses. This may cause a problem that it is difficult to reduce the third lens group in weight and size and requires a large load and a large driving motor to move the focus lens. Further, it is difficult to shorten time taken for focusing and heighten the AF speed without great driving power.

Likewise, the third lens group in the zoom lens disclosed in Reference 2 is also made of three negative, positive, negative lenses so that it faces a problem in terms of decreasing its size and weight and increasing the AF speed.

SUMMARY OF THE INVENTION

The present invention aims to provide a compact, high-speed AF, high performance, wide-angle zoom lens suitable for a digital still camera including a compact size focus lens and achieving half angle of view of 41 degrees or more, high zoom ratio of about 1.9 to 3.4, and resolution equivalent to an image sensor with 5 to 10 million pixels or more. It also aims to provide a camera device and a data terminal device incorporating such a zoom lens.

According to one aspect of the present invention, a zoom lens includes a first lens group having a positive refractive power, a second lens group having a negative refractive power, a third lens group having a negative refractive power and comprised of a single negative lens, a fourth lens group having a positive refractive power, a fifth lens group having a positive refractive power, the first to fifth groups being arranged along an optical axis in order from an object side, and an aperture stop disposed between the third lens group and the fourth lens group, wherein when zooming from a wide angle end to a telephoto end, the zoom lens 10 is moved so that an interval between the first and second lens groups increases, an interval between the second and third lens groups varies, an interval between the third and fourth lens groups decreases, and the third lens group focuses, and the second lens group is arranged to have a focal length to satisfy the following condition:

$$0.95 < |f2/\sqrt{(fw*ft)}| < 4.0$$

where f2 is a focal length of the second lens group, fw is a focal length of the entire zoom lens 10 at the wide angle end and ft is a focal length of the entire zoom lens 10 at telephoto end.

BRIEF DESCRIPTION OF THE DRAWINGS

Features, embodiments, and advantages of the present invention will become apparent from the following detailed description with reference to the accompanying drawings.

DETAILED DESCRIPTION OF THE PREFERRED EMBODIMENTS

Figure 1:
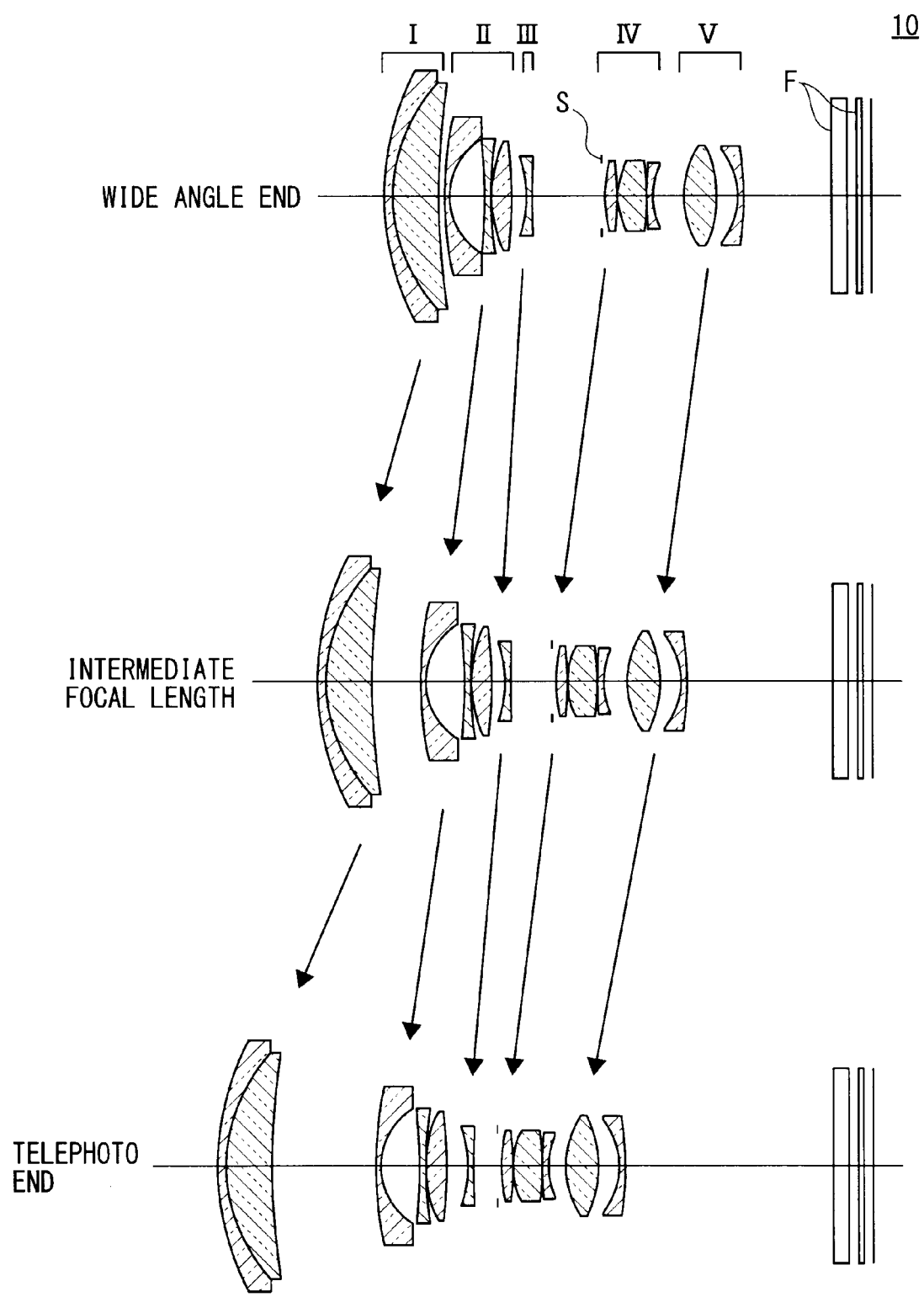
FIG. 1 shows the configuration of a zoom lens according to a first embodiment.

Hereinafter, embodiments of the present invention will be described in detail with reference to the accompanying drawings. Wherever possible, the same reference numbers will be used throughout the drawings to refer to the same or like parts.

FIGS. 1 to 7 show zoom lenses 10 according to first to seventh embodiments of the present invention, respectively. In the drawing an object side is the left side and an image plane side is the right side. The zoom lens 10 is comprised of a first lens group I having a positive refractive power, a second lens group II having a negative optical power, a third lens group III being a focus lens having a negative refractive power, an aperture stop S, a fourth lens group IV having a positive refractive power, a fifth lens group V having a positive refractive power, and a filter F arranged on the optical axis in this order from an object side (leftward in the drawings). The third lens group III is a single negative meniscus lens. The filter F is two transparent parallel plates as various filters such as an optical low pass filter, an infrared cutoff filter, or a cover glass for a light receiving element as a CCD sensor. In zooming from the wide angle end to the telephoto end, the first to fifth lens groups I to V independently moves toward the object side so that an interval between the first and second lens groups increases, an interval between the second and third lens groups varies, an interval between the third and fourth lens groups decreases, and the third lens group focuses. Note that variation in the interval between the second and third lens groups includes not constant variation.

In FIGS. 1 to 7 the topmost views are lens arrangements at wide angle end, the middle views are the same at intermediate focal length and the bottommost views are the same at telephoto end. The arrows indicate the positional changes of the lens groups while zooming from the wide angle end to the telephoto end.

The zoom lens 10 according to any one of later-described first to seventh embodiments of the present invention are configured to satisfy the following three conditions.

$$0.95 < |f2/\sqrt{(fw*ft)}| < 4.0 \qquad 1.$$

$$0.9 < f2/f3 < 6.0 \qquad 2.$$

$$0.5 < |f1/f2| < 2.1 \qquad 3.$$

where f1, f2 and f3 are the focal lengths of the first to third lens groups, respectively, fw is the focal length of the entire zoom lens 10 at wide angle end and ft is the focal length of the entire zoom lens 10 at telephoto end.

The first condition is to define a proper ratio of the focal length f2 of the second lens group and the focal length of the entire zoom lens 10 at an intermediate focal length which is an average of the focal lengths fw, ft of the entire zoom lens 10 at wide angle end and at telephoto end.

When the ratio exceeds the upper limit of 4.0 in the first condition, the moving amount of the second lens group II having a main zooming function becomes large, which elongates the total length of the zoom lens 10 in use and hinders the downsizing of the zoom lens 10 or a data terminal device as a digital camera.

When the ratio is below the lower limit of 0.95, the focal length of the second lens group becomes too short relative to an intermediate focal length and the negative power thereof is relatively high. This increases an aberration during zooming. Also, with a high production error, it is hard to mass-produce this kind of lens.

The second condition is to define a proper ratio of the focal lengths of the second and third lens groups II, III. When the ratio exceeds the upper limit of 6.0 in the second condition, the moving amount of the second lens group II becomes large, which elongates the total length of the zoom lens 10 in use. At the same time the focal length of the third lens group III becomes short so that the negative power thereof becomes large, causing a large aberration in focusing.

When the ratio is below the lower limit of 0.9, the focal length of the second lens group II becomes too short and the negative power thereof is too high. This increases an aberration during zooming. Also, with a high production error, it is difficult to mass-produce this kind of lens. Moreover, the focal length of the third lens group III becomes too long and the negative power thereof becomes low. This increases a necessary moving amount for focusing and elongates the total length of the zoom lens 10 in use.

The third condition is to define a proper ratio of the absolute values of the focal lengths of the first and second lens groups I, II. When the ratio exceeds the upper limit of 2.1 in the third condition, the focal length of the second lens group becomes too short and the negative power thereof is too high. This increases an aberration during zooming. Also, with a high production error it is difficult to mass-produce this kind of lens.

Meanwhile, when the ratio is below the lower limit of 0.5, the moving amount of the second lens group II becomes large and the negative power thereof becomes too small, which increases the moving amount during zooming and elongates the total length of the zoom lens 10 in use.

The first lens group I in FIG. 1 is a cemented lens comprised of a negative meniscus lens having a convex surface on the object side and a positive meniscus lens having a convex surface face on the object side.

The second lens group II is made up of a negative meniscus lens with an aspheric, convex surface on the object side, a biconcave lens with a larger concave on the image plane side, and a biconvex lens concave lens with a larger convex on the object side in this order.

The third lens group III is made up of a single biconcave lens with a larger concave on the object side.

The fourth lens group IV is made up of a biconvex lens with an aspheric, larger convex surface on the object side, a biconvex lens with a larger convex on the object side, and a negative meniscus lens with a convex surface on the object side in this order.

The fifth lens group V is made up of a biconvex lens with a larger convex on the object side and a negative meniscus lens with aspheric surfaces on both sides and a convex surface on the image plane side.

Figure 2:
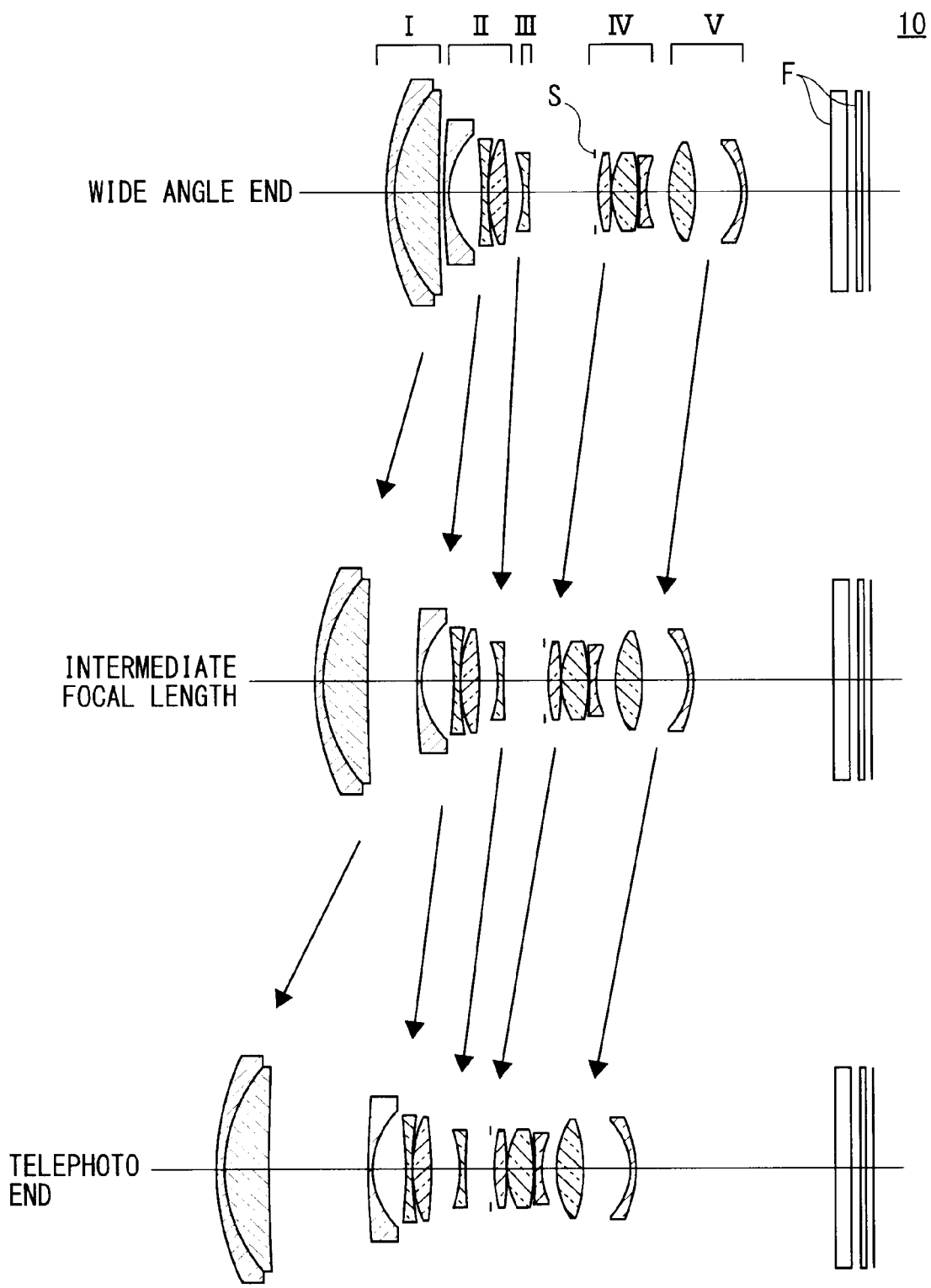
FIG. 2 shows the configuration of a zoom lens according to a second embodiment.

The zoom lens 10 in FIG. 2 is the same as that in FIG. 1 except that the second lens of the second lens group II and the third lens of the fourth lens group IV from the object side are biconcave lenses with a larger concave on the image plane side.

Figure 3:
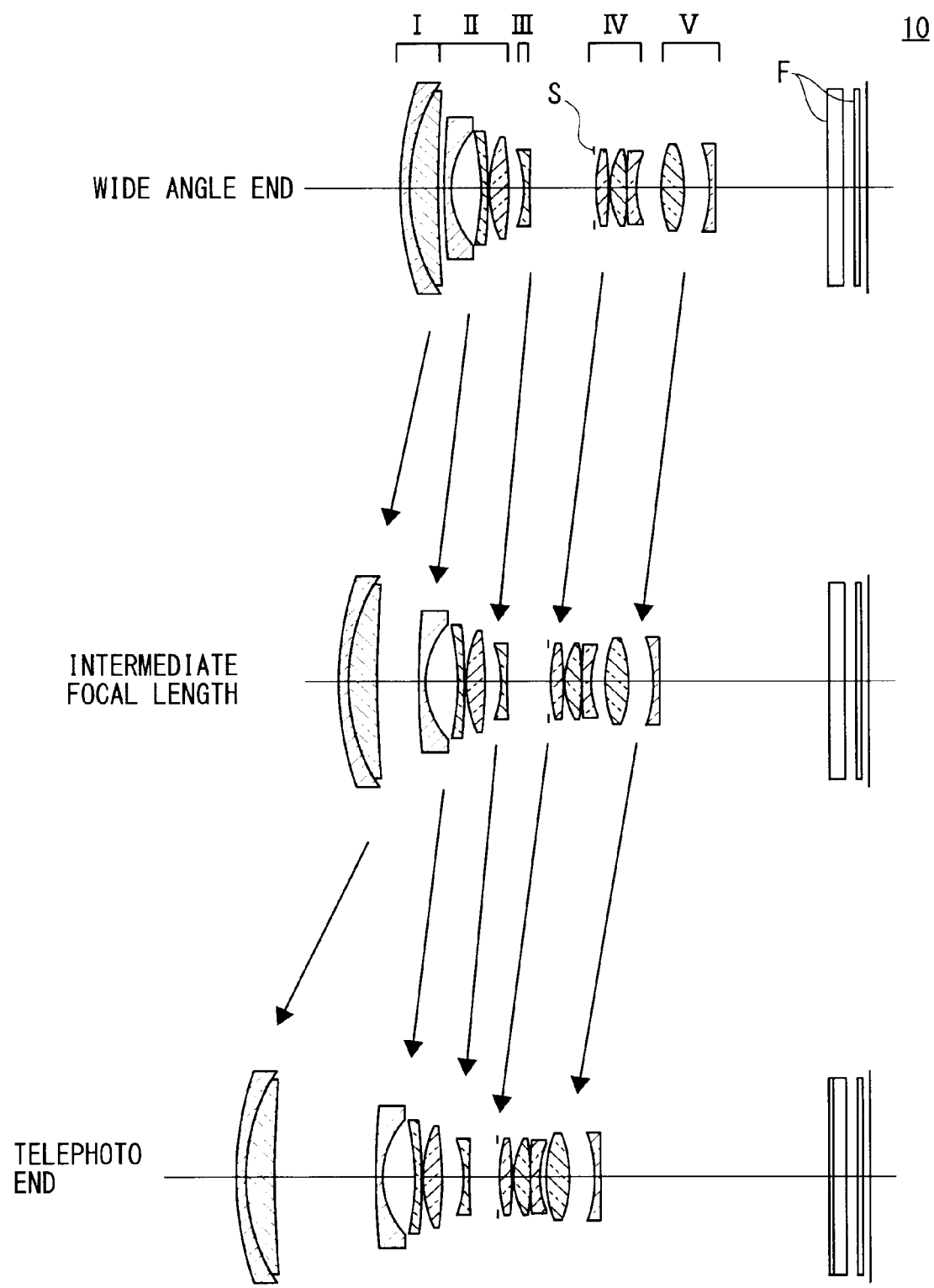
FIG. 3 shows the configuration of a zoom lens according to a third embodiment.

The zoom lens 10 in FIG. 3 is the same as that in FIG. 1 except that the second lens of the second lens group II from the object side is a negative meniscus lens with a convex surface on the image plane side.

Figure 4:
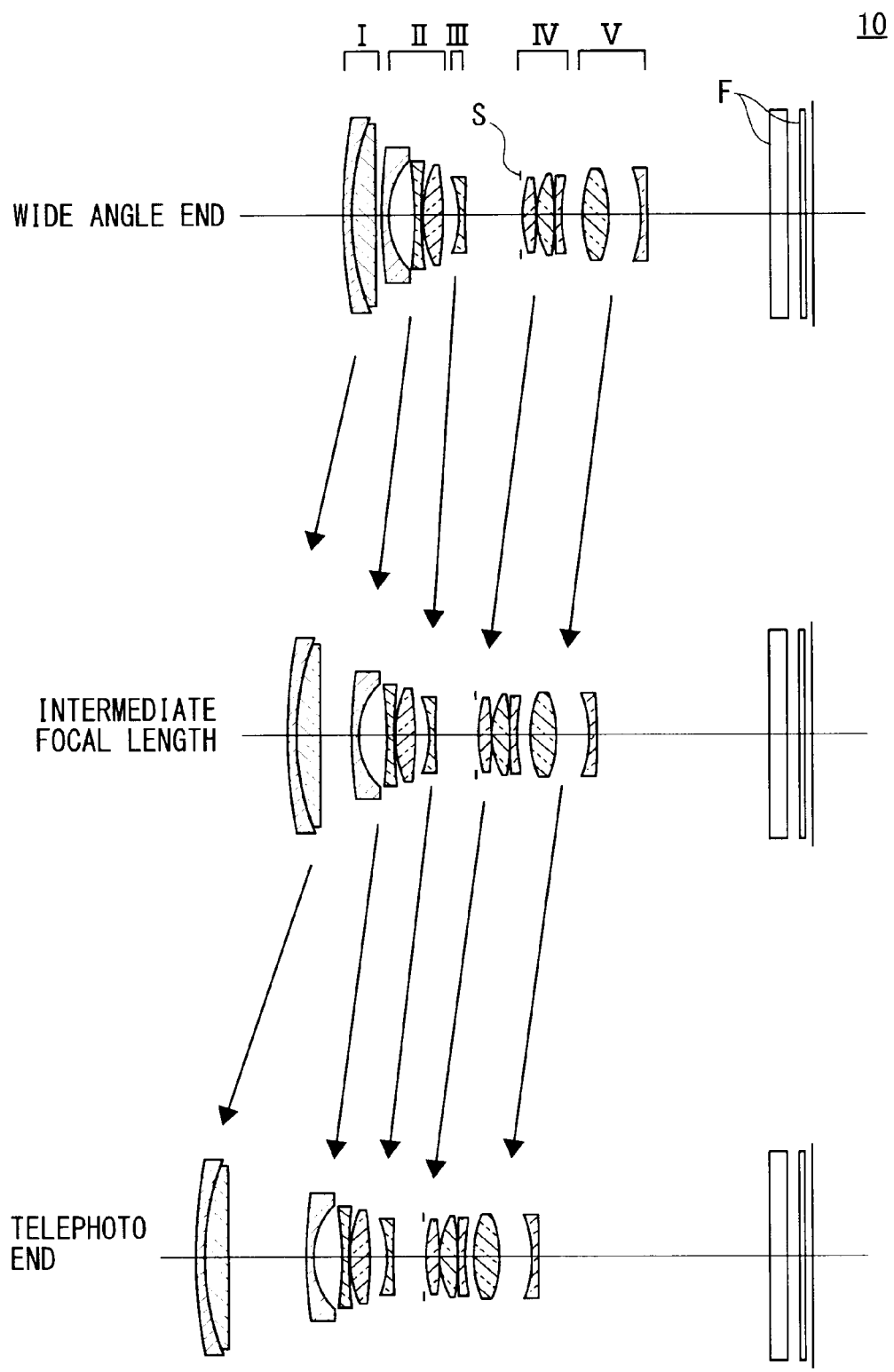
FIG. 4 shows the configuration of a zoom lens according to a fourth embodiment.

The zoom lens 10 in FIG. 4 is the same as that in FIG. 1 except that the second lens of the first lens group I is a biconvex lens with a larger convex on the object side and the second lens of the fifth lens group V from the object side has an aspheric surface only on the image plane side.

Figure 5:
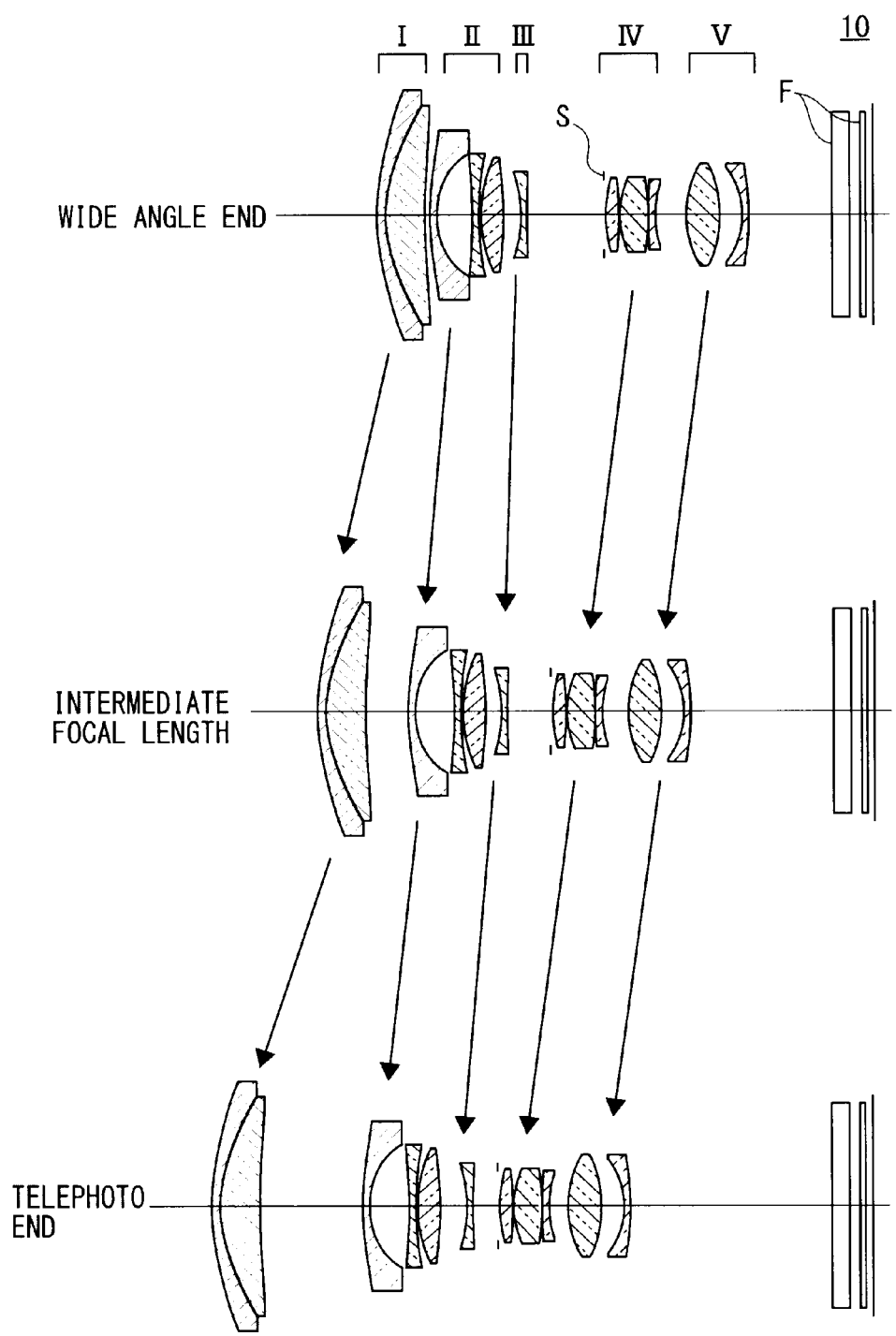
FIG. 5 shows the configuration of a zoom lens according to a fifth embodiment.

The zoom lens 10 in FIG. 5 is configured the same as that in FIG. 1.

Figure 6:
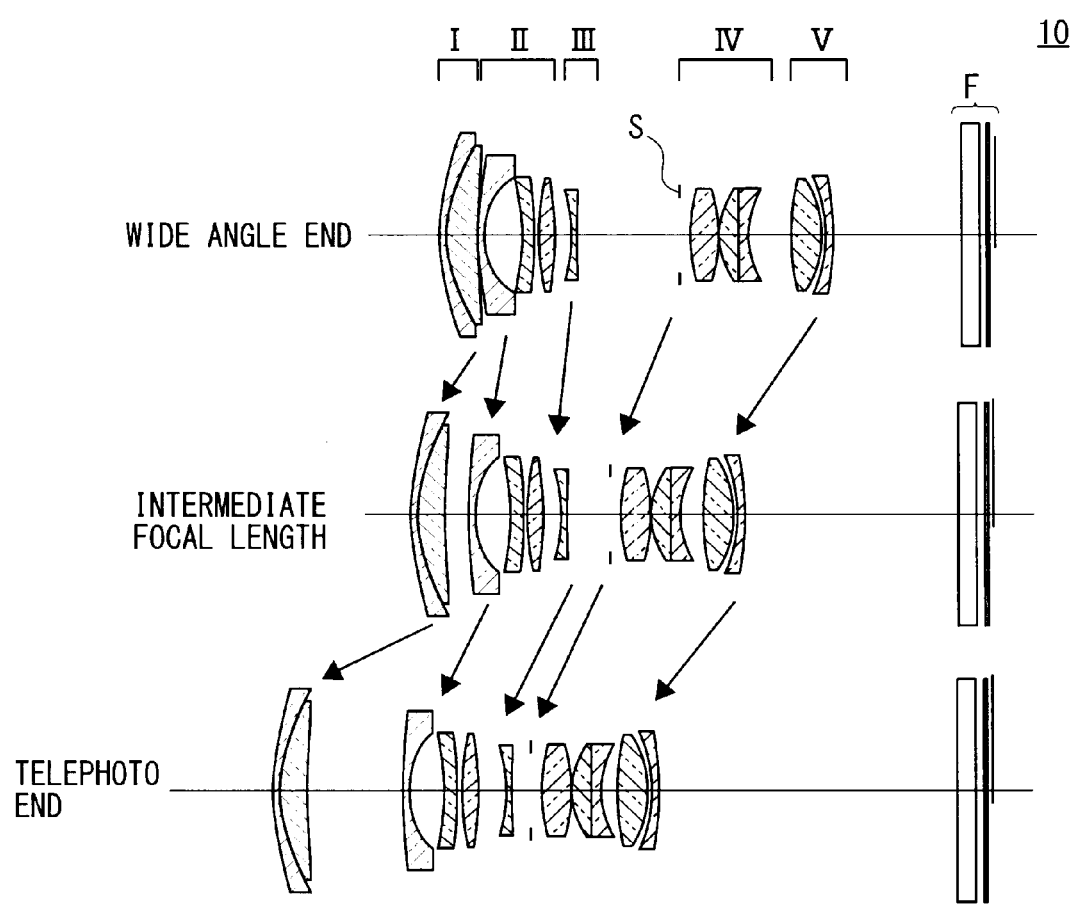
FIG. 6 shows the configuration of a zoom lens according to a sixth embodiment.

According to the zoom lens 10 in FIG. 6, the first lens group I is a cemented lens of a negative meniscus lens with a convex surface and a positive meniscus lens with a convex surface on the object side in this order.

The second lens group II is made up of a meniscus lens with aspheric surfaces on both sides and a convex surface on the object side, a biconcave lens with a larger concave on the image plane side, and a biconvex lens with a larger convex on the object side.

The third lens group III is a biconcave lens with a larger concave on the object side.

The fourth lens group IV is made up of a biconvex lens with aspheric surfaces on both sides and a larger convex on the object side and a cemented lens of a biconvex lens with a larger convex on the object side and a biconcave lens on the object side in this order.

The fifth lens group V is made up of a biconvex lens with a larger convex on the image plane side and a negative meniscus lens with aspheric surfaces on both sides and a convex surface on the image plane side in this order.

Figure 7:
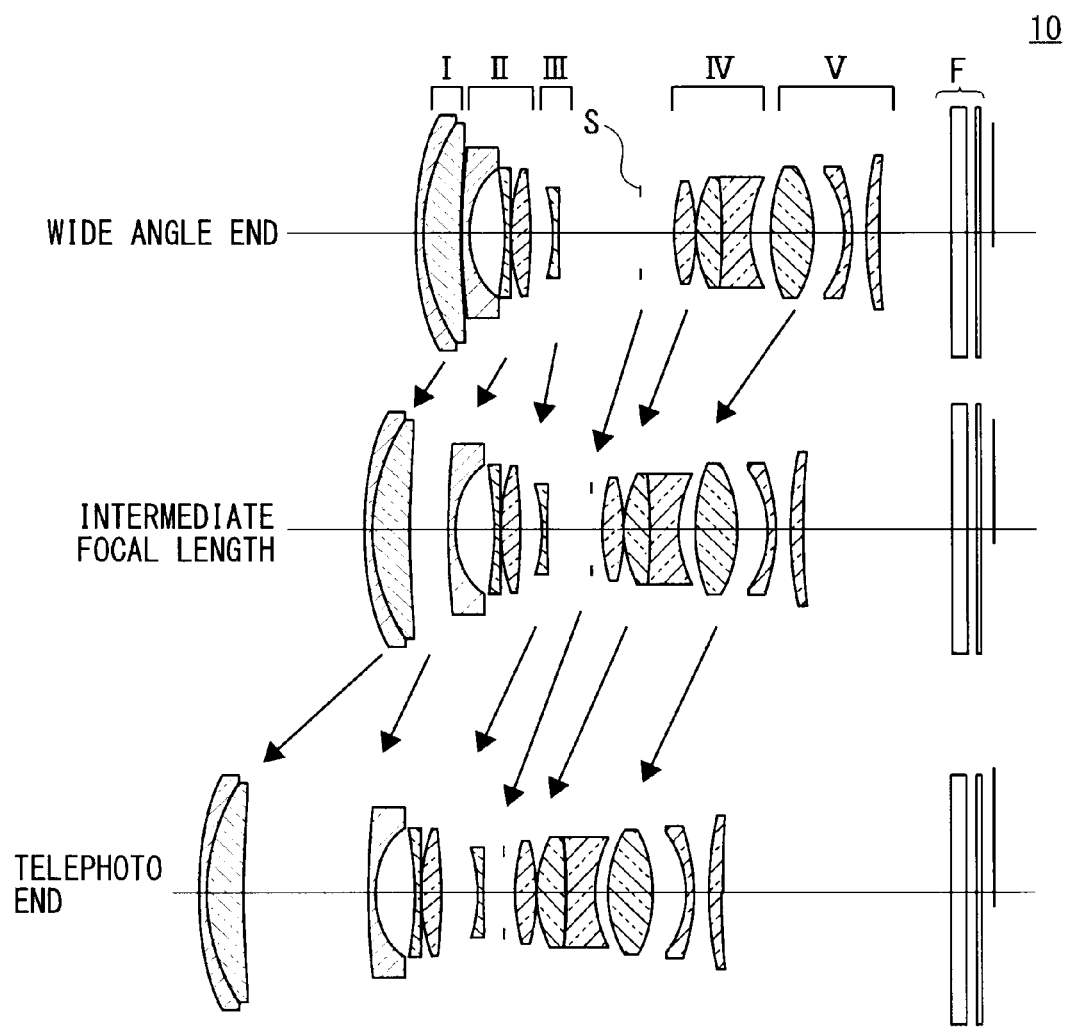
FIG. 7 shows the configuration of a zoom lens according to a seventh embodiment.

The zoom lens 10 in FIG. 7 is the same as that in FIG. 6 except that the fifth lens group V is comprised of a biconvex lens with a larger convex on the image plane side, a negative meniscus lens with a convex surface on the image plane side and a positive meniscus lens with a convex surface on the object side in this order.

Integrally moving the aperture stop and the fourth lens group IV in zooming makes it unnecessary to provide an additional aperture moving mechanism, which contributes to reducing the number of elements of the zoom lens 10 and downsizing a lens barrel unit.

By allowing image distortion in an electrically correctable range, the zoom lens 10 can properly correct aberration other than distortion, contributing to improving angle of view, zoom ratio, and optical performance.

Preferably, distortion is corrected in a zooming area including either or both of wide angle end and intermediate focal length. Up to about 20% of distortion can be corrected electrically.

Preferably, the first lens group I is made up of two lenses, a negative meniscus lens with a convex surface on the object side and a positive lens with a high convex surface on the object side in this order from the object side. This is because to achieve higher magnification, it is necessary to sufficiently reduce aberration occurring in the first lens group I. An increase in the composite magnification of the two to fourth lens groups II to IV is needed in order to heighten magnification and especially elongate the focal length at telephoto end. With a higher composite magnification, the aberration caused by the first lens group I is enlarged on the image plane.

The second lens group II is preferably comprised of three lenses, negative lens, negative lens, and positive lens with a large curvature on the image plane side in this order from the object side. This makes it possible to make the principal point of the second lens group closer to the image plane side, contributing to reducing the total length of the optical system at telephoto end.

The open f-value of the aperture stop can be constant irrespective of zooming. However, it is preferable to set it to be larger at telephoto end than at wide angle end to reduce a change in f-number. To decrease the amount of light reaching the image plane, the aperture can be smaller in diameter. However, it is preferable to insert an ND filter instead of changing F-number so as to prevent a decrease in resolution due to diffraction.

Figure 15A:
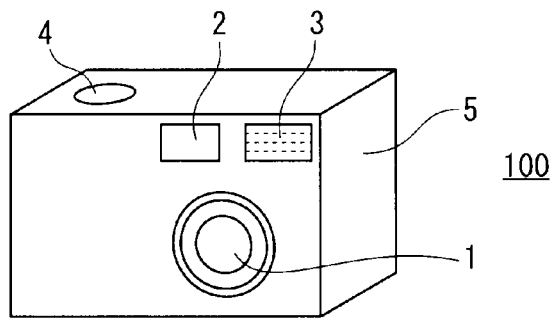
FIG. 15A is a front view of an example of a hand-held data terminal device and FIG. 15B is a back view thereof.
Figure 15B:
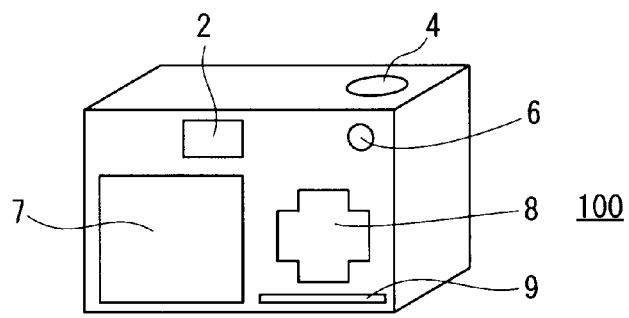
Figure 16:
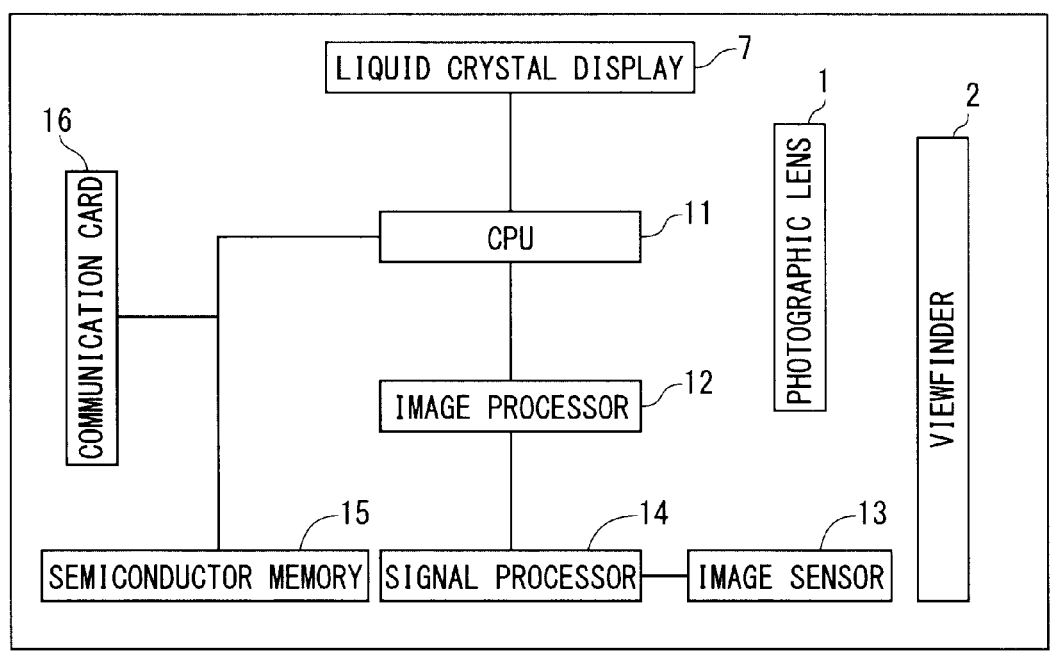
FIG. 16 shows the system of the hand-held data terminal device in FIGS. 15A, 15B by way of example.

Next, with reference to FIGS. 15A, 15B and FIG. 16, an example of a hand-held data terminal device is described. A hand-held data terminal device 100 in FIG. 15A, 15B comprises a viewfinder 2, a strobe light portion 3, a shutter button 4, a body 5, a power-on switch 6, a liquid crystal display (LCD) 7, an operation button 8, and a memory card throttle 9.

FIG. 16 shows a system configuration of the hand-held data terminal device 100. It includes a photographic lens 1 as the zoom lens 10 according to any one of the first to seventh embodiments of the present invention, a light receiving element 13 to receive an optical image of a subject formed by the photographic lens 1 and a signal processor 14 to convert outputs from the light receiving element 13 into digital data under the control of a CPU 11.

Converted digital image data is processed by an image processor 12 for display on the LCD 7 or for storage in a semiconductor memory 15. The image data can be transmitted to outside through a communication card 16 which is accommodated in the memory card throttle 9. The hand-held data terminal device 100 excluding this communication function is a camera device.

Images during shooting and image data stored in the semiconductor memory 15 can be displayed on the LCD 7.

The photographic lens 1 is retreated into the body 5 during non-use in FIG. 15A, and extended therefrom upon turning-on of the power-on switch 6. When extended, the first to fifth lens groups I to V of the zoom lens 10 are positioned at a wide angle end in a lens barrel, for example. The positions of the lens groups are changed by manipulation of a not-shown zoom lever to zoom to a telephoto end. Along with a change in the angle of view of the photographic lens 1, the viewfinder 2 also changes in magnification.

Upon a half-press to the shutter button 4, the camera device focuses on a subject. To focus on the subject, the third lens group III is moved or alternatively, the light receiving element can be moved. Upon a full press to the shutter button 4, the subject is shot.

By manipulating the operation button 8, the image stored in the semiconductor memory 15 is displayed on the LCD 7 or transmitted to outside via the communication card 16. The semiconductor memory 15 and the communication card 16 are inserted into a dedicated or general purpose throttle 9.

With the photographic lens 1 in a retreated state, the first to fifth lens groups I to V do not need to be aligned on the optical axis. For example, the second lens groups II can be placed off-axis to be accommodated in the camera body in parallel to the other lens groups. In this manner, it is possible to further reduce the thickness of the hand-held data terminal device 100.

In the following the seven examples of the zoom lens 10 will be described referring to tables 1 to 15.

Numeral codes and symbols used hereinafter denote as follows:
f: total focal length of lens system
F: F-number
ω: half field of angle (degree)
d: interval between two lens surfaces on the axis
r: curvature radius of lens surface (paraxial curvature radius of aspheric surface)
$n_d$: refractive index
$v_d$: Abbe number
θgF partial dispersion ratio
K: conic constant of aspheric surface
$A_4$: fourth order aspheric coefficient
$A_6$: sixth order aspheric coefficient
$A_8$: eighth order aspheric coefficient
$A_{10}$: tenth order aspheric coefficient
$A_{12}$: twelfth order aspheric coefficient
$A_{10}$: fourteenth order aspheric coefficient
The aspheric surface is expressed by the following known formula:

$$X=CH^2/\{1+\sqrt{(1-(1+K)C^2H^2)}\}+A_4 \cdot H^4+A_6 \cdot H^6+A_8 \cdot H^8+A_{10} \cdot H^{10}+A_{12} \cdot H^{12}+A_{14} \cdot H^{14}$$

where X is an amount of asphericity along the optical axis, C is a paraxial curvature (inverse of paraxial curvature radius), H is height from the optical axis, and K is a conic constant.

The unit of length is millimeter. "HOYA" and "OHARA" in the tables refer to glass manufacturers, HOYA Corporation, OHARA Inc., respectively. Note that in the first to seventh embodiments paraxial image height is set to 13 mm at wide angle end to electrically correct image distortion to 14.3 mm in image height. In the tables asterisk * indicates that the lens surface is aspheric.

First Embodiment

The following table 1 shows specific data on the zoom lens 10 in FIG. 1 with f=15.99 to 46.53, F=3.66 to 5.81, and ω=41.8 to 17.08.

TABLE 1

| Face No. | r | d | nd | vd | θ gF | Glass Material | |
|---|---|---|---|---|---|---|---|
| R1 | 39.12273 | 1.2 | 1.92286 | 18.9 | 0.6495 | SNPH2 | OHARA |
| R2 | 23.28233 | 6.87824 | 1.883 | 40.76 | 0.5667 | SLAH58 | OHARA |
| R3 | 124.3126 | Variable A | | | | | |
| R4* | 51.18576 | 0.9 | 1.9027 | 31 | 0.5943 | LLAH86 | OHARA |
| R5 | 9.80471 | 5.13832 | | | | | |
| R6 | −53.7786 | 0.9 | 1.883 | 40.76 | 0.5667 | SLAH58 | OHARA |
| R7 | 40.9171 | 0.1 | | | | | |
| R8 | 17.43533 | 3.08478 | 1.92286 | 18.9 | 0.6495 | SNPH2 | OHARA |
| R9 | −49.33344 | Variable B | | | | | |
| R10 | −19.12351 | 0.9 | 1.883 | 40.76 | 0.5667 | SLAH58 | OHARA |
| R11 | 99.43789 | Variable C | | | | | |
| R12 | ∞ | 0.4 | | | | | |
| R13* | 20.92318 | 1.78393 | 1.58913 | 61.15 | 0.5382 | LBAL35 | OHARA |
| R14 | −40.36773 | 0.1 | | | | | |
| R15 | 11.55704 | 4.21375 | 1.497 | 81.54 | 0.5375 | SFPL51 | OHARA |
| R16 | −39.61642 | 0.1 | | | | | |
| R17 | 223.6179 | 0.9 | 1.90366 | 31.32 | 0.5947 | TAFD25 | HOYA |
| R18 | 12.13573 | Variable D | | | | | |
| R19 | 13.21477 | 4.80138 | 1.51823 | 58.9 | 0.5457 | SNSL3 | OHARA |
| R20 | −16.47821 | 3.08285 | | | | | |
| R21* | −10.3597 | 0.9 | 1.864 | 40.58 | 0.5669 | LLAH83 | OHARA |
| R22* | −25.28317 | Arbitrary | | | | | |
| R23 | ∞ | 2.3 | 1.5168 | 64.2 | | Filters | |
| R24 | ∞ | 1.5 | | | | | |
| R25 | ∞ | 0.7 | 1.5168 | 64.2 | | Cover Glass | |
| R26 | ∞ | | | | | | |

Specific data on the aspheric surfaces of the zoom lens 10 according to the first embodiment are as follows. The values herein are such that −1.17092E-08 denotes $-1.17092*10^{-8}$, for example.

4$^{th}$ Surface
K=0
A4=1.056440E-06
A6=4.970200E-08
A8=−7.07385E-10
A10=5.361300E-12
A12=−1.57191E-14

13$^{th}$ Surface
K=0
A4=−7.78796E-05
A6=−2.65621E-07
A8=−1.50697E-09

21$^{st}$ Surface
K=0
A4=3.625180E-05
A6=1.430340E-06
A8=−1.49906E-08

22$^{nd}$ Surface
K=0
A4=1.042670E-04
A6=1.381650E-06
A8=−1.17092E-08

The following table 2 shows variable amounts among the lenses in question in the table 1.

TABLE 2

| Focal length | 15.99 | 27.14 | 46.53 |
|---|---|---|---|
| Variable A | 0.80000 | 7.14187 | 15.11568 |
| Variable B | 2.16319 | 2.4815 | 3.69545 |
| Variable C | 10.23376 | 6.27306 | 3.7 |
| Variable D | 4.47212 | 3.38477 | 2.42395 |

Figure 8A:
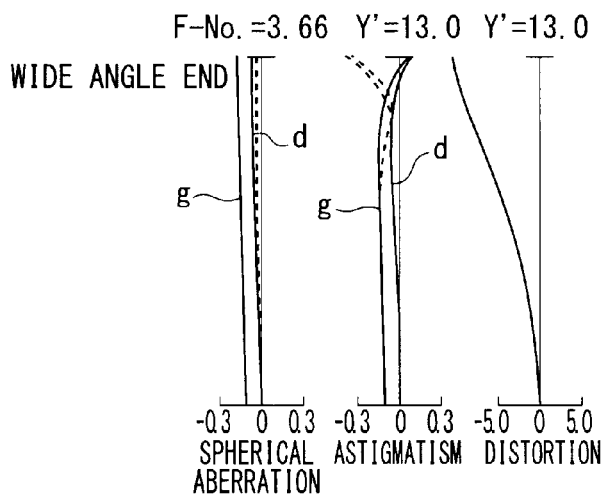
FIGS. 8A to 8C show the aberration curves of the zoom lens according to the first embodiment.
Figure 8A:
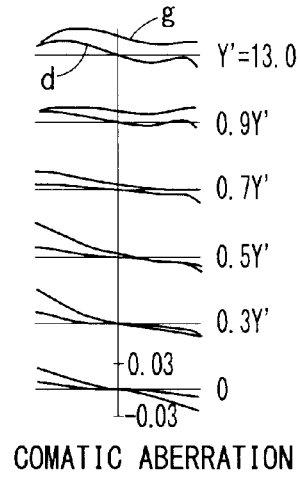
Figure 8B:
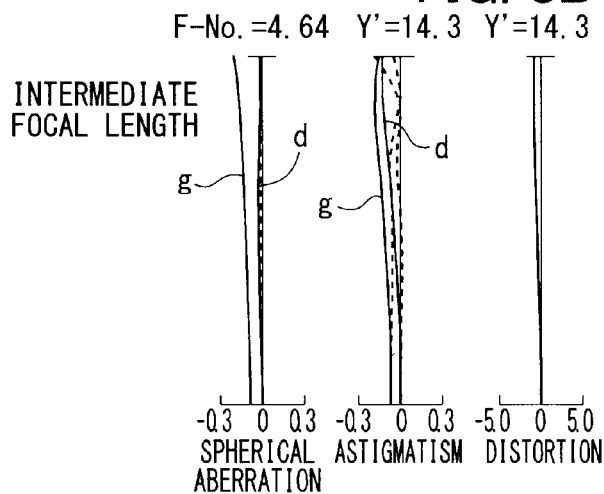
Figure 8B:
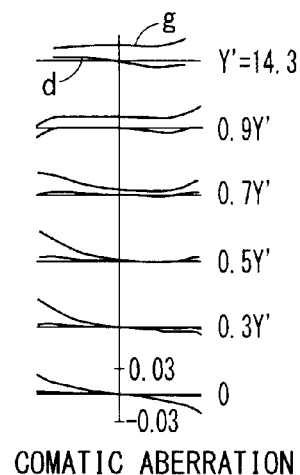
Figure 8C:
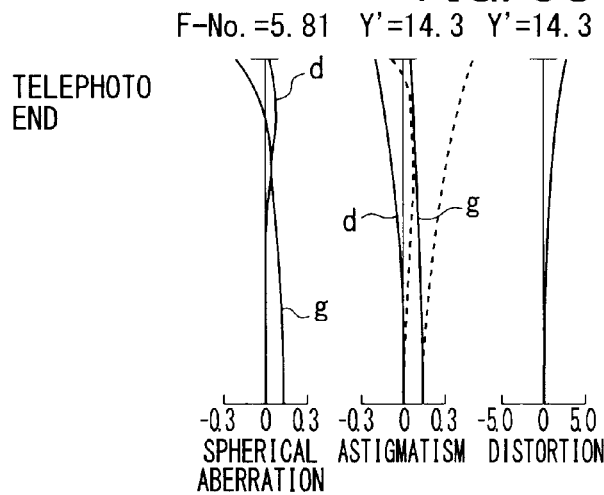
Figure 8C:
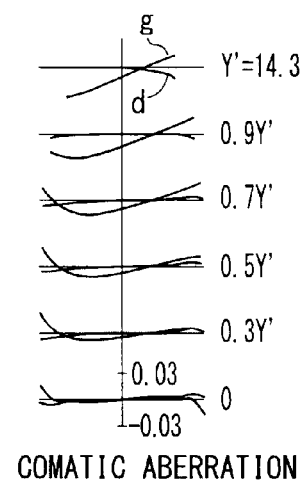

FIGS. 8A to 8C show the aberration curves of the zoom lens 10 according to the first embodiment at wide angle end, intermediate focal length, and telephoto end, respectively. In the drawings, broken lines in spherical aberration indicate sine condition, solid lines and broken lines in astigmatism indicate sagittal and meridional, respectively, and d indicates d-line, and g indicates g-line. Y' is maximum image height.

Second Embodiment

The following table 3 shows specific data on the zoom lens 10 in FIG. 2 with f=18.65 to 54.3, F=3.62 to 5.83, and ω=37.5 to 14.8.

TABLE 3

| Face No. | r | d | nd | vd | θ gF | Glass Material | |
|---|---|---|---|---|---|---|---|
| R1 | 34.87529 | 1.2 | 1.92286 | 18.9 | 0.6495 | SNPH2 | OHARA |
| R2 | 20.88097 | 6.4864 | 1.762 | 40.1 | 0.5765 | SLAM55 | OHARA |
| R3 | 274.4841 | Variable A | | | | | |
| R4* | 83.17104 | 0.9 | 1.9027 | 31 | 0.5943 | LLAH86 | OHARA |
| R5 | 11.04146 | 4.70677 | | | | | |
| R6 | −71.07226 | 0.9 | 1.883 | 40.76 | 0.5667 | SLAH58 | OHARA |
| R7 | 35.27754 | 0.1 | | | | | |
| R8 | 17.30152 | 2.79533 | 1.92286 | 18.9 | 0.6495 | SNPH2 | OHARA |
| R9 | −47.57628 | Variable B | | | | | |

TABLE 3-continued

| Face No. | r | d | nd | vd | θ gF | Glass Material | |
|---|---|---|---|---|---|---|---|
| R10 | −16.6178 | 0.9 | 1.883 | 40.76 | 0.5667 | SLAH58 | OHARA |
| R11 | 392.0196 | Variable C | | | | | |
| R12 | ∞ | 0.4 | | | | | |
| R13* | 25.28309 | 1.86904 | 1.58913 | 61.15 | 0.5382 | LBAL35 | OHARA |
| R14 | −33.48911 | 0.1 | | | | | |
| R15 | 11.13412 | 4.02771 | 1.497 | 81.54 | 0.5375 | SFPL51 | OHARA |
| R16 | −21.68179 | 0.1 | | | | | |
| R17 | −50.30385 | 0.9 | 1.90366 | 31.32 | 0.5947 | TAFD25 | HOYA |
| R18 | 12.84878 | Variable D | | | | | |
| R19 | 14.1697 | 3.92313 | 1.54072 | 47.23 | 0.5651 | STIL2 | OHARA |
| R20 | −20.88484 | 6.7438 | | | | | |
| R21* | −9.13029 | 0.9 | 1.864 | 40.58 | 0.5669 | LLAH83 | OHARA |
| R22* | −17.25279 | Arbitrary | | | | | |
| R23 | ∞ | 2.3 | 1.5168 | 64.2 | | Filters | |
| R24 | ∞ | 1.5 | | | | | |
| R25 | ∞ | 0.7 | 1.5168 | 64.2 | | Cover Glass | |
| R26 | ∞ | | | | | | |

Specific data on the aspheric surfaces of the zoom lens 10 according to the second embodiment are as follows.

$4^{th}$ Surface
K=0
A4=−2.56108E−06
A6=1.044020E−07
A8=−1.4309E−09
A10=1.355110E−11
A12=−5.04361E−14

$13^{th}$ Surface
K=0
A4=−9.25137E−05
A6=−3.51547E−07
A8=−8.00052E−09

$21^{st}$ Surface
K=0
A4=−2.51375E−04
A6=3.572660E−06
A8=1.359970E−08

$22^{nd}$ Surface
K=0
A4=−1.75754E−04
A6=4.150840E−06
A8=−1.1655E−08

The following table 4 shows variable amounts among the lenses in question in the table 3.

TABLE 4

| Focal length | 18.65 | 31.67 | 54.30 |
|---|---|---|---|
| Variable A | 0.80000 | 7.14675 | 14.74821 |
| Variable B | 2.34612 | 2.74197 | 4.08503 |
| Variable C | 9.71508 | 6.17599 | 3.7 |
| Variable D | 3.39079 | 2.77585 | 2.23637 |

Figure 9A:
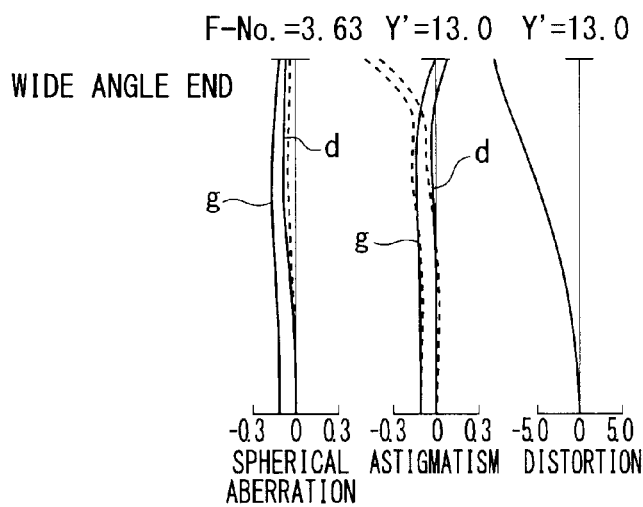
FIGS. 9A to 9C show the aberration curves of the zoom lens according to the second embodiment.
Figure 9A:
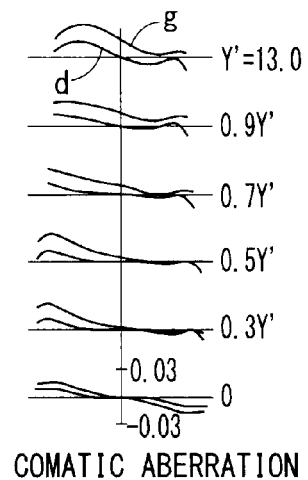
Figure 9B:
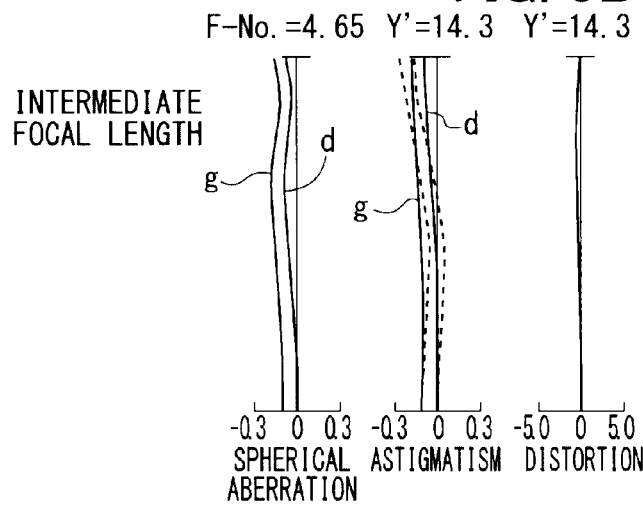
Figure 9B:
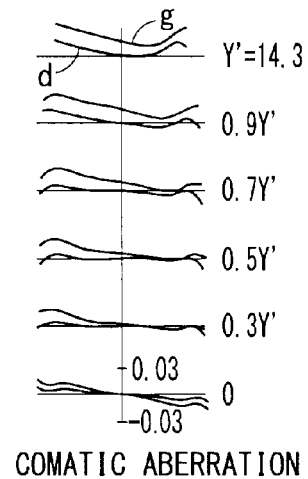
Figure 9C:
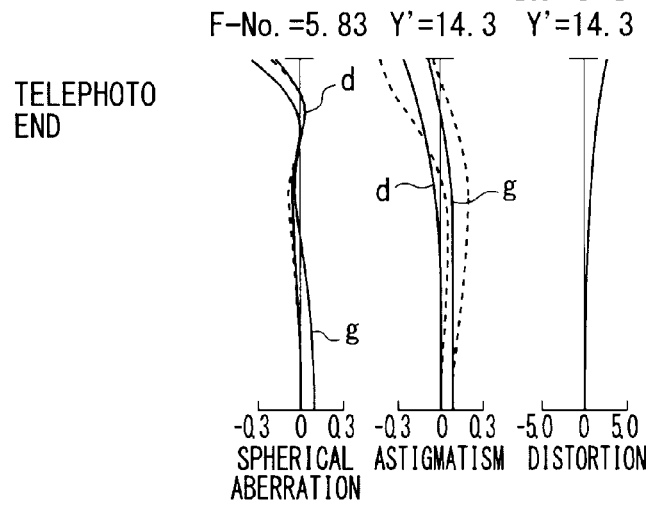
Figure 9C:
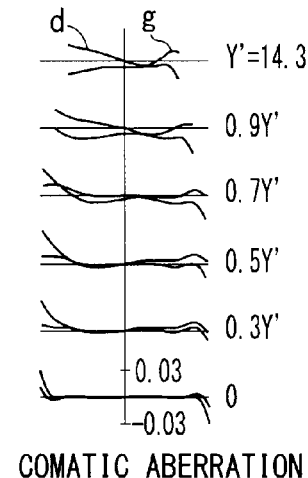

FIGS. 9A to 9C show the aberration curves of the zoom lens 10 according to the second embodiment at wide angle end, intermediate focal length, and telephoto end, respectively.

Third Embodiment

The following table 5 shows specific data on the zoom lens 10 in FIG. 3 with f=16.15 to 38.0, F=3.63 to 5.86, and ω=41.5 to 20.6.

TABLE 5

| Face No. | r | d | nd | vd | θ gF | Glass Material | |
|---|---|---|---|---|---|---|---|
| R1 | 47.76035 | 1.2 | 1.92286 | 18.9 | 0.6495 | SNPH2 | OHARA |
| R2 | 26.40714 | 4.14071 | 1.883 | 40.76 | 0.5667 | SLAH58 | OHARA |
| R3 | 157.9338 | Variable A | | | | | |
| R4* | 317.0593 | 0.9 | 1.9027 | 31 | 0.5943 | LLAH86 | OHARA |
| R5 | 11.33016 | 4.09559 | | | | | |
| R6 | −32.4071 | 0.9 | 1.883 | 40.76 | 0.5667 | SLAH58 | OHARA |
| R7 | −147.884 | 0.1 | | | | | |
| R8 | 18.6336 | 2.62463 | 1.92286 | 18.9 | 0.6495 | SNPH2 | OHARA |
| R9 | −54.59411 | Variable B | | | | | |
| R10 | −15.1769 | 0.9 | 1.883 | 40.76 | 0.5667 | SLAH58 | OHARA |
| R11 | 116.3303 | Variable C | | | | | |
| R12 | ∞ | 0.4 | | | | | |
| R13* | 21.56915 | 1.81261 | 1.58913 | 61.15 | 0.5382 | LBAL35 | OHARA |
| R14 | −35.00674 | 0.1 | | | | | |
| R15 | 11.54805 | 2.26864 | 1.497 | 81.54 | 0.5375 | SFPL51 | OHARA |
| R16 | −62.39683 | 0.1 | | | | | |
| R17 | 84.20776 | 1.24552 | 1.90366 | 31.32 | 0.5947 | TAFD25 | HOYA |
| R18 | 15.65855 | Variable D | | | | | |
| R19 | 19.02132 | 3.04876 | 1.497 | 81.54 | 0.5375 | SFPL51 | OHARA |
| R20 | −19.88286 | 3.40451 | | | | | |
| R21* | −20.70843 | 0.9 | 1.864 | 40.58 | 0.5669 | LLAH83 | OHARA |

TABLE 5-continued

| Face No. | r | d | nd | vd | θ gF | Glass Material |
|---|---|---|---|---|---|---|
| R22* | −930.2132 | Arbitrary | | | | |
| R23 | ∞ | 2.3 | 1.5168 | 64.2 | | Filters |
| R24 | ∞ | 1.5 | | | | |
| R25 | ∞ | 0.7 | 1.5168 | 64.2 | | Cover Glass |
| R26 | ∞ | | | | | |

Specific data on the aspheric surfaces of the zoom lens 10 according to the third embodiment are as follows.
$4^{th}$ Surface
K=0
A4=2.777450E-05
A6=−3.99444E-08
A8=6.048460E-10
A10=1.095400E-12
A12=−2.48491E-14
$13^{th}$ Surface
K=0
A4=−9.36505E-05
A6=4.158310E-08
A8=−5.89151E-09
$21^{st}$ Surface
K=0
A4=5.741240E-06
A6=−1.82504E-06
A8=4.009180E-09
$22^{nd}$ Surface
K=0
A4=1.736520E-04
A6=−1.06638E-06
A8=2.185120E-08

The following table 6 shows variable amounts among the lenses in question in the table 5.

TABLE 6

| Focal length | 16.15 | 24.79 | 38.00 |
|---|---|---|---|
| Variable A | 0.80000 | 5.90137 | 13.5357 |
| Variable B | 2.34612 | 2.31144 | 3.32017 |
| Variable C | 9.71508 | 5.58473 | 3.7 |
| Variable D | 3.39079 | 1.89864 | 1 |

Figure 10A:
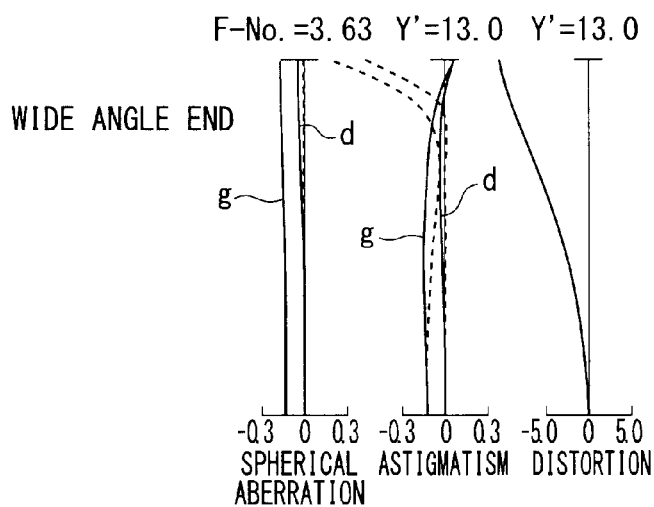
FIGS. 10A to 10C show the aberration curves of the zoom lens according to the third embodiment.
Figure 10A:
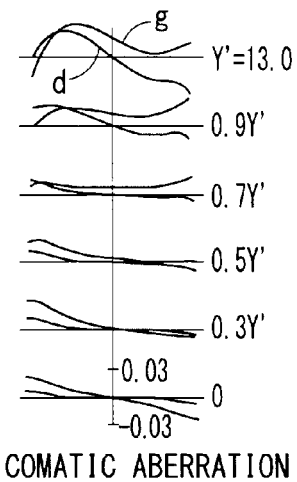
Figure 10B:
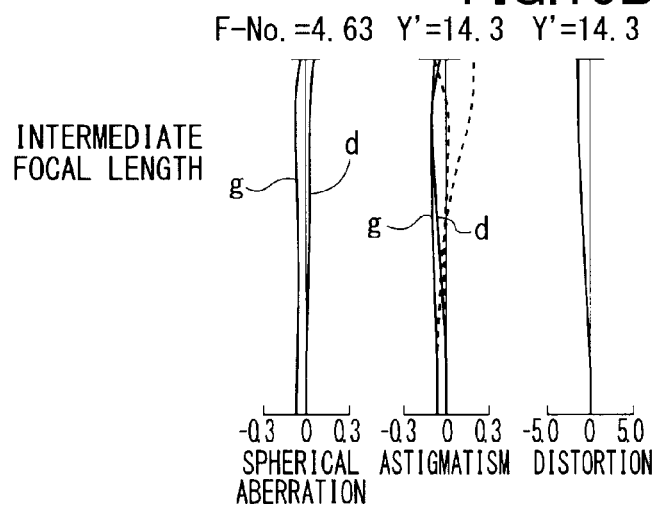
Figure 10B:
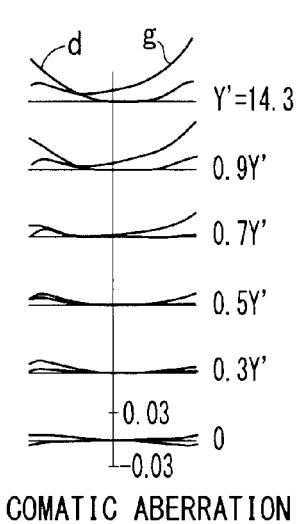
Figure 10C:
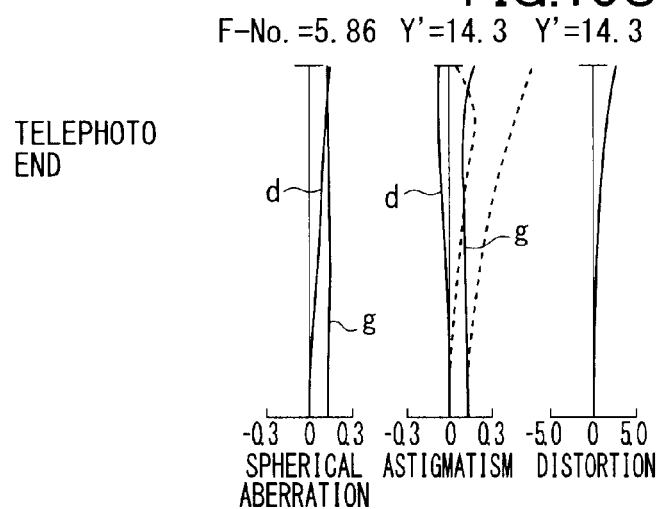
Figure 10C:
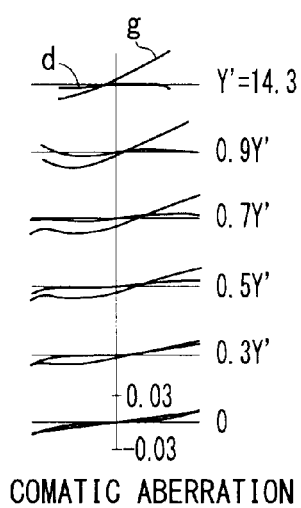

FIGS. 10A to 10C show the aberration curves of the zoom lens 10 according to the third embodiment at wide angle end, intermediate focal length, and telephoto end, respectively.

Fourth Embodiment

The following table 7 shows specific data on the zoom lens 10 in FIG. 4 with f=16.15 to 31.66, F=3.62 to 5.84, and ω=41.5 to 24.3.

TABLE 7

| Face No. | r | d | nd | vd | θ gF | Glass Material | |
|---|---|---|---|---|---|---|---|
| R1 | 83.13818 | 1.1 | 1.92286 | 18.9 | 0.6495 | SNPH2 | OHARA |
| R2 | 35.23645 | 3.06595 | 1.883 | 40.76 | 0.5667 | SLAH58 | OHARA |
| R3 | −1098.942 | Variable A | | | | | |
| R4* | 72.91434 | 0.9 | 1.9027 | 31 | 0.5943 | LLAH86 | OHARA |
| R5 | 10.82705 | 3.43129 | | | | | |
| R6 | −37.55262 | 0.9 | 1.883 | 40.76 | 0.5667 | SLAH58 | OHARA |
| R7 | 93.3434 | 0.1 | | | | | |
| R8 | 16.89882 | 2.42724 | 1.92286 | 18.9 | 0.6495 | SNPH2 | OHARA |
| R9 | −52.03616 | Variable B | | | | | |
| R10 | −14.10128 | 0.9 | 1.883 | 40.76 | 0.5667 | SLAH58 | OHARA |
| R11 | 87.39539 | Variable C | | | | | |
| R12 | ∞ | 0.4 | | | | | |
| R13* | 26.39605 | 1.49002 | 1.7432 | 49.29 | 0.5529 | LLAM60 | OHARA |
| R14 | −75.65242 | 0.1 | | | | | |
| R15 | 11.88519 | 2.22222 | 1.497 | 81.54 | 0.5375 | SFPL51 | OHARA |
| R16 | −71.13735 | 0.1637 | | | | | |
| R17 | 242.9493 | 0.9 | 2.00069 | 25.46 | 0.6133 | TAFD40 | HOYA |
| R18 | 25.12199 | Variable D | | | | | |
| R19 | 14.62481 | 3.33144 | 1.497 | 81.54 | 0.5375 | SFPL51 | OHARA |
| R20 | −20.51756 | 4.205 | | | | | |
| R21 | −13.433 | 0.9 | 1.864 | 40.58 | 0.5669 | LLAH83 | OHARA |
| R22* | −40.47867 | Arbitrary | | | | | |
| R23 | ∞ | 2.3 | 1.5168 | 64.2 | | Filters | |
| R24 | ∞ | 1.5 | | | | | |
| R25 | ∞ | 0.7 | 1.5168 | 64.2 | | Cover Glass | |
| R26 | ∞ | | | | | | |

Specific data on the aspheric surfaces of the zoom lens 10 according to the fourth embodiment are as follows.
$4^{th}$ Surface
K=0
A4=5.736250E-06
A6=1.541920E-07
A8=−1.54552E-09
A10=2.609640E-11
A12=−1.36118E-13
$13^{th}$ Surface
K=0
A4=−6.60531E-05

A6=−9.67387E-08
A8=−6.97485E-09
22$^{nd}$ Surface
K=0
A4=2.216200E-04
A6=2.466620E-06
A8=−2.45507E-08
A10=6.485260E-10

The following table 8 shows variable amounts among the lenses in question in the table 7.

TABLE 8

| Focal length | 16.15 | 22.65 | 31.66 |
|---|---|---|---|
| Variable A | 0.80000 | 4.05898 | 9.84558 |
| Variable B | 1.95868 | 2.01912 | 2.53384 |
| Variable C | 6.90823 | 4.98661 | 3.7 |
| Variable D | 2.51971 | 1.58386 | 1 |

Figure 11A:
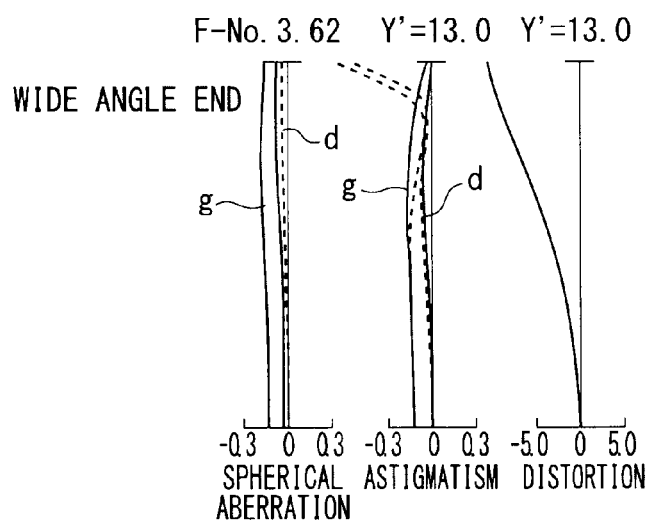
FIGS. 11A to 11C show the aberration curves of the zoom lens according to the fourth embodiment.
Figure 11A:
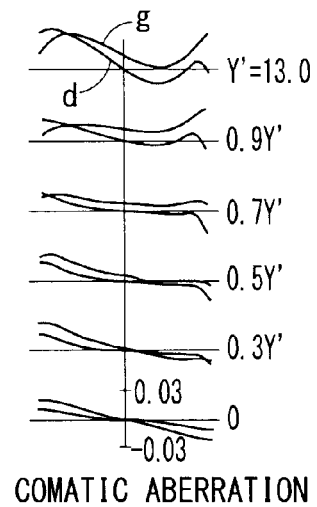
Figure 11B:
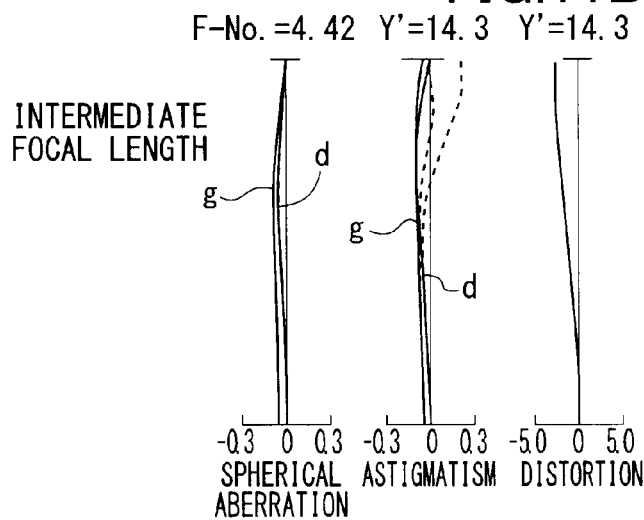
Figure 11B:
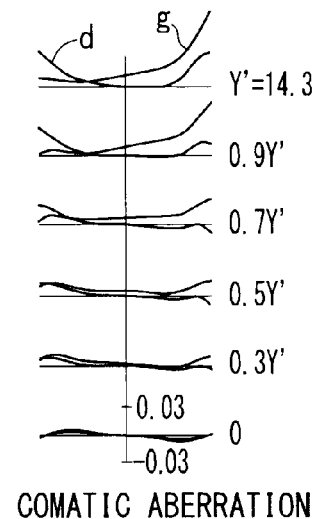
Figure 11C:
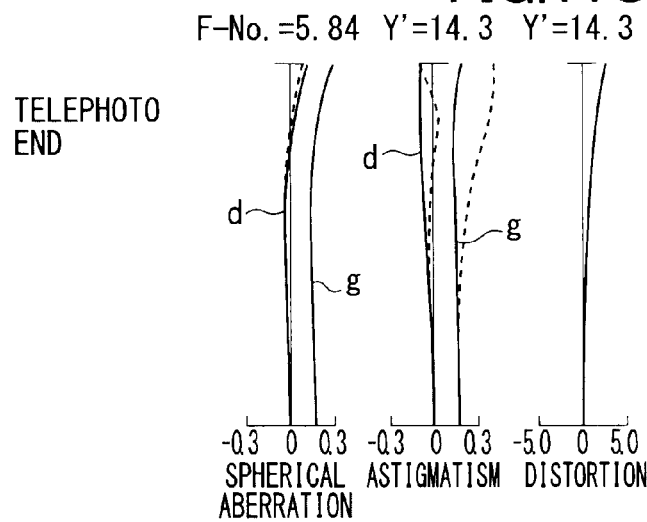
Figure 11C:
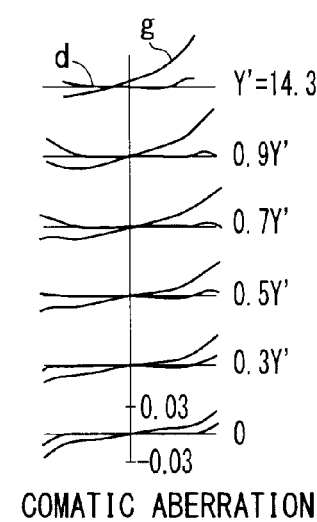

FIGS. 11A to 11C show the aberration curves of the zoom lens 10 according to the fourth embodiment at wide angle end, intermediate focal length, and telephoto end, respectively.

Fifth Embodiment

The following table 9 shows specific data on the zoom lens 10 in FIG. 5 with f=15.99 to 46.56, F=3.65 to 5.85, and ω=41.8 to 17.07.

A10=3.418800E-12
A12=−8.46642E-15
13$^{th}$ Surface
K=0
A4=−7.30888E-05
A6=−2.79226E-07
A8=−1.37626E-09
21$^{st}$ Surface
K=0
A4=2.979630E-05
A6=1.179710E-06
A8=−6.349E-09
22$^{nd}$ Surface
K=0
A4=9.580120E-05
A6=1.208010E-06
A8=−8.5897E-09

The following table 10 shows variable amounts among the lenses in question in the table 9.

TABLE 10

| Focal length | 15.99 | 27.15 | 46.56 |
|---|---|---|---|
| Variable A | 0.80000 | 6.30035 | 15.1167 |
| Variable B | 2.42693 | 2.6565 | 4.26083 |
| Variable C | 11.25392 | 6.56736 | 3.7 |
| Variable D | 4.5809 | 3.73281 | 2.84179 |

TABLE 9

| Face No. | r | d | nd | vd | θ gF | Glass Material | |
|---|---|---|---|---|---|---|---|
| R1 | 40.67199 | 1.2 | 1.92286 | 18.9 | 0.6495 | SNPH2 | OHARA |
| R2 | 23.68628 | 5.77418 | 1.883 | 40.76 | 0.5667 | SLAH58 | OHARA |
| R3 | 131.1395 | Variable A | | | | | |
| R4* | 59.03292 | 0.9 | 1.9027 | 31 | 0.5943 | LLAH86 | OHARA |
| R5 | 10.72146 | 5.25932 | | | | | |
| R6 | −64.05069 | 0.9 | 1.883 | 40.76 | 0.5667 | SLAH58 | OHARA |
| R7 | 43.98409 | 0.35569 | | | | | |
| R8 | 19.15126 | 3.19144 | 1.92286 | 18.9 | 0.6495 | SNPH2 | OHARA |
| R9 | −52.5303 | Variable B | | | | | |
| R10 | −19.97082 | 0.9 | 1.883 | 40.76 | 0.5667 | SLAH58 | OHARA |
| R11 | 139.5677 | Variable C | | | | | |
| R12 | ∞ | 0.4 | | | | | |
| R13* | 20.55518 | 1.74731 | 1.58913 | 61.15 | 0.5382 | LBAL35 | OHARA |
| R14 | 51.17341 | 0.1 | | | | | |
| R15 | 11.55689 | 4.22074 | 1.497 | 81.54 | 0.5375 | SFPL51 | OHARA |
| R16 | −41.75375 | 0.1 | | | | | |
| R17 | 166.2512 | 0.9 | 1.90366 | 31.32 | 0.5947 | TAFD25 | HOYA |
| R18 | 12.05572 | Variable D | | | | | |
| R19 | 12.90449 | 4.87317 | 1.51823 | 58.9 | 0.5457 | SNSL3 | OHARA |
| R20 | −17.00145 | 3.31255 | | | | | |
| R21* | −10.01064 | 0.9 | 1.864 | 40.58 | 0.5669 | LLAH83 | OHARA |
| R22* | −26.34596 | Arbitrary | | | | | |
| R23 | ∞ | 2.3 | 1.5168 | 64.2 | | Filters | |
| R24 | ∞ | 1.5 | | | | | |
| R25 | ∞ | 0.7 | 1.5168 | 64.2 | | Cover Glass | |
| R26 | ∞ | | | | | | |

Specific data on the aspheric surfaces of the zoom lens 10 according to the fifth embodiment are as follows.
4$^{th}$ Surface
K=0
A4=3.219740E-06
A6=3.603850E-08
A8=−5.10179E-10

Figure 12A:
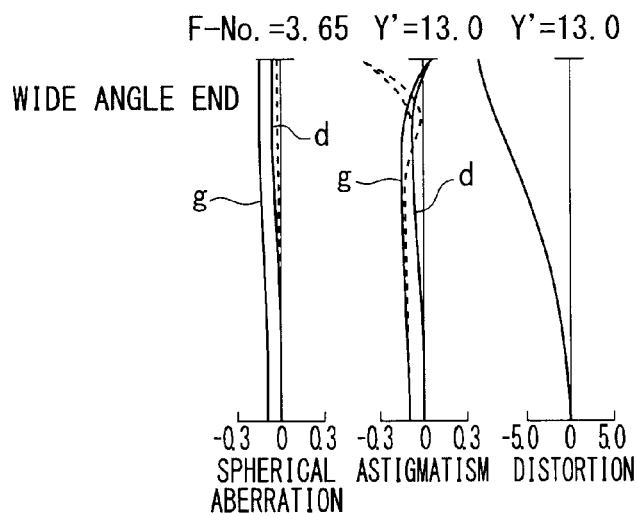
FIGS. 12A to 12C show the aberration curves of the zoom lens according to the fifth embodiment.
Figure 12A:
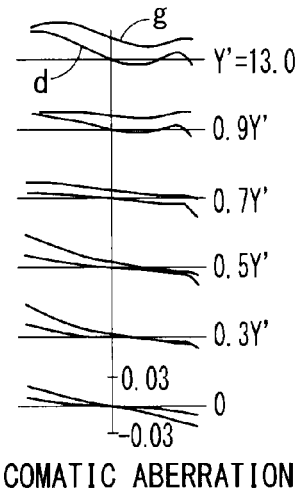
Figure 12B:
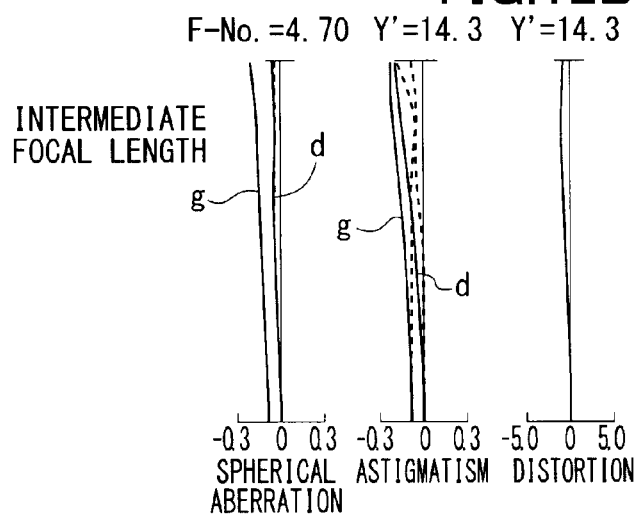
Figure 12B:
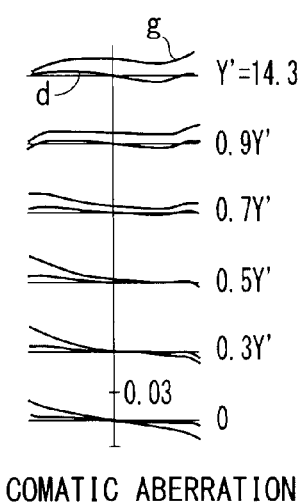
Figure 12C:
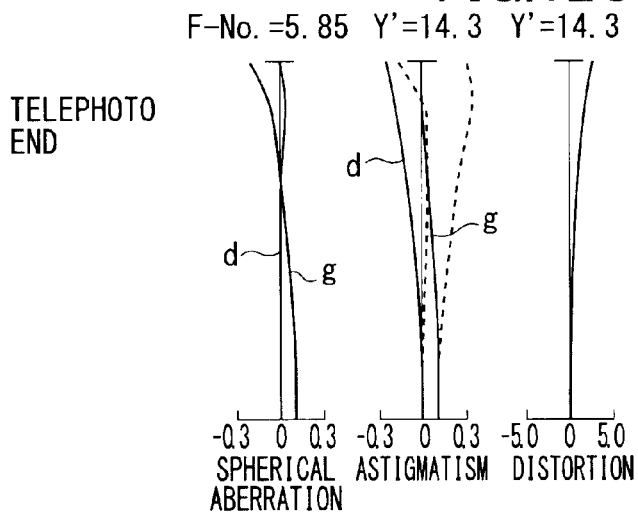
Figure 12C:
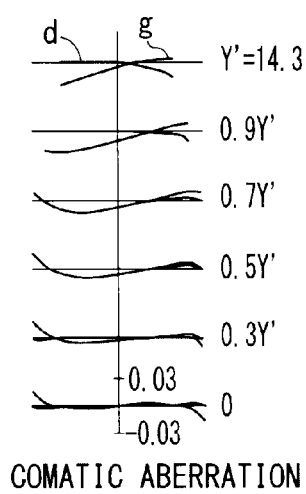

FIGS. 12A to 12C show the aberration curves of the zoom lens 10 according to the fifth embodiment at wide angle end, intermediate focal length, and telephoto end, respectively.

Sixth Embodiment

The following table 11 shows specific data on the zoom lens 10 in FIG. 6 with f=15.99 to 54.41, F=3.66 to 5.79, and ω=42.04 to 14.34.

TABLE 11

| Face No. | r | D | nd | vd | θ gF | Glass Material | |
|---|---|---|---|---|---|---|---|
| R1 | 34.51441 | 1.2 | 1.92286 | 18.9 | 0.6495 | SNPH2 | OHARA |
| R2 | 21.77594 | 4.40074 | 1.883 | 40.76 | 0.5667 | SLAH58 | OHARA |
| R3 | 126.168 | Variable A | | | | | |
| R4* | 136.0666 | 0.9 | 1.9027 | 31 | 0.5943 | LLAH86 | OHARA |
| R5* | 10.28534 | 5.48325 | | | | | |
| R6 | −25.02075 | 1.84627 | 1.883 | 40.76 | 0.5667 | SLAH58 | OHARA |
| R7 | −66.40143 | 0.51992 | | | | | |
| R8 | 28.05173 | 2.59762 | 1.92286 | 18.9 | 0.6495 | SNPH2 | OHARA |
| R9 | −48.70825 | Variable B | | | | | |
| R10 | −24.95469 | 0.8 | 1.883 | 40.76 | 0.5667 | SLAH58 | OHARA |
| R11 | 427.2674 | Variable C | | | | | |
| R12 | ∞ | 1.45 | | | | | |
| R13* | 15.88001 | 4.59188 | 1.48749 | 70.24 | 0.5300 | SFSL5 | OHARA |
| R14* | −18.47558 | 0.1 | | | | | |
| R15 | 11.4623 | 2.88009 | 1.51742 | 52.43 | 0.5564 | SNSL36 | OHARA |
| R16 | −999.9999 | 1.49462 | 1.91082 | 35.25 | 0.5821 | TAFD35 | HOYA |
| R17 | 10.9762 | Variable D | | | | | |
| R18 | 30.68723 | 4.6992 | 1.497 | 81.54 | 0.5375 | SFPL51 | |
| R19 | −13.38081 | 0.64542 | | | | | |
| R20* | −18.81562 | 0.95408 | 1.854 | 40.39 | 0.5677 | LLAH85 | |
| R21* | −81.37377 | Arbitrary | | | | | |
| R22 | ∞ | 2.3 | 1.5168 | 64.2 | | Filters | |
| R23 | ∞ | 1.5 | | | | | |
| R24 | ∞ | 0.7 | 1.5168 | 64.2 | | Cover Glass | |
| R28 | ∞ | | | | | | |

Specific data on the aspheric surfaces of the zoom lens 10 according to the sixth embodiment are as follows.

$4^{th}$ Surface
 K=0.000000E+00
 A4=3.572750E-05
 A6=−7.660460E-07
 A8=8.247110E-09
 A10=−3.983520E-11
 A12=7.403260E-14

$5^{th}$ Surface
 K=0.000000E+00
 A4=1.279760E-05
 A6=−8.573790E-07
 A8=3.096290E-09
 A10=−6.310570E-11
 A12=1.179080E-12

$13^{th}$ Surface
 K=0.000000E+00
 A4=−7.200890E-05
 A6=−8.845630E-07
 A8=1.304940E-08
 A10=−5.719170E-10

$14^{th}$ Surface
 K=0.000000E+00
 A4=2.228670E-05
 A6=−8.349910E-07
 A8=9.411840E-09
 A10=−4.635290E-10

$20^{th}$ Surface
 K=0.000000E+00
 A4=−4.248460E-05
 A6=−2.236380E-06
 A8=2.516120E-08
 A10=−4.518890E-11

$21^{st}$ Surface
 K=0.000000E+00
 A4=−1.262000E-05
 A6=−1.745830E-06
 A8=2.242420E-08
 A10=−5.413360E-11

The following table 12 shows variable amounts among the lenses in question in the table 11.

TABLE 12

| Focal length | 15.99 | 29.5 | 54.41 |
|---|---|---|---|
| Variable A | 0.44 | 3.842 | 13.729 |
| Variable B | 2.475 | 2.767 | 4.025 |
| Variable C | 15.663 | 6.959 | 2.75 |
| Variable D | 6.654 | 3.736 | 2.091 |

Figure 13A:
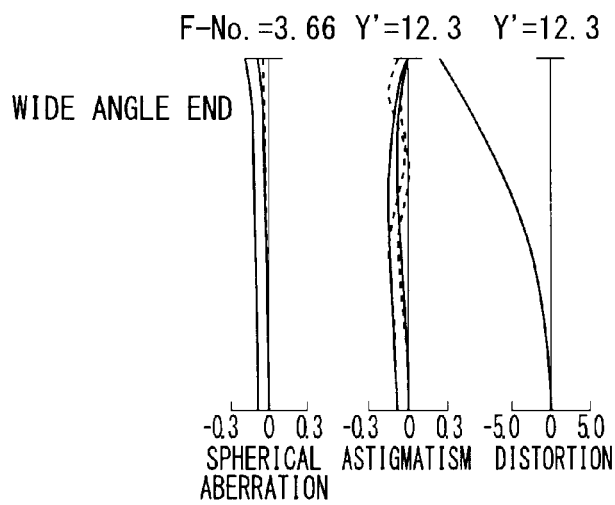
FIGS. 13A to 13C show the aberration curves of the zoom lens according to the sixth embodiment.
Figure 13A:
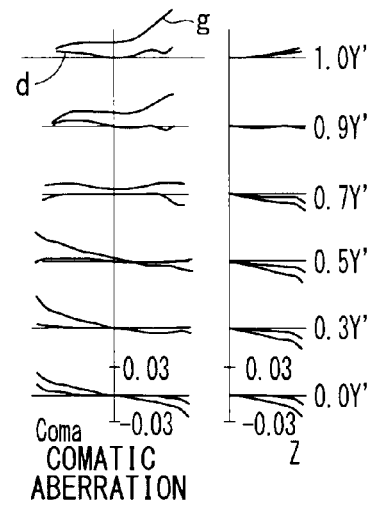
Figure 13B:
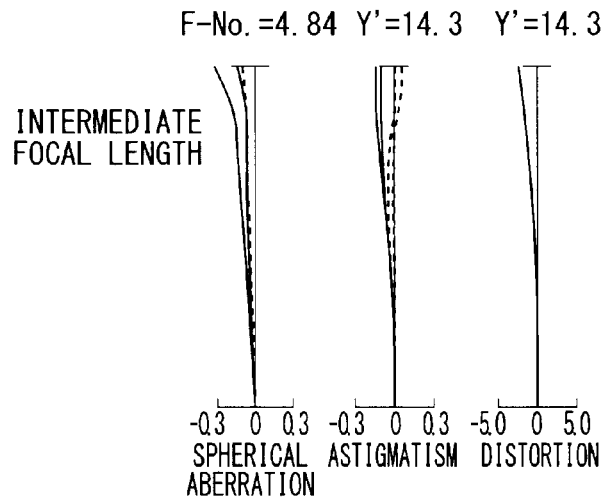
Figure 13B:
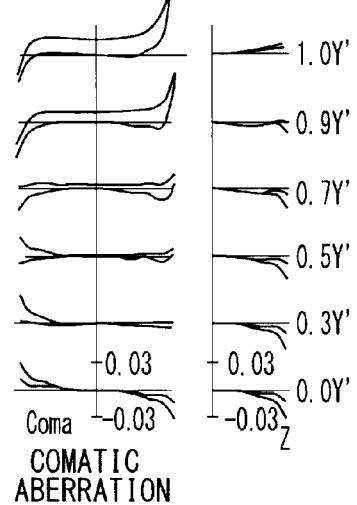
Figure 13C:
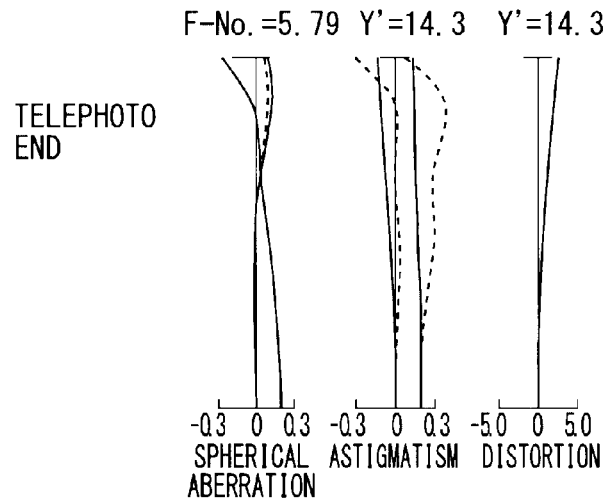
Figure 13C:
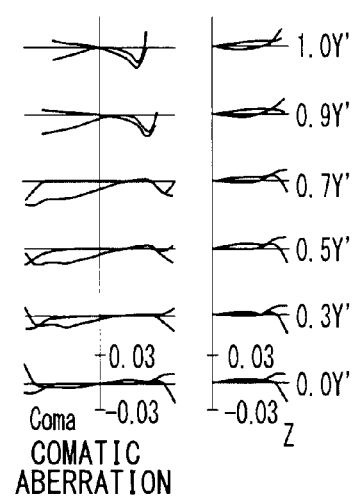

FIGS. 13A to 13C show the aberration curves of the zoom lens 10 according to the sixth embodiment at wide angle end, intermediate focal length, and telephoto end, respectively.

Seventh Embodiment

The following table 13 shows specific data on the zoom lens 10 in FIG. 7 with f=15.99 to 54.41, F=3.66 to 5.84, and ω=42.07 to 14.41.

TABLE 13

| Face No. | r | d | nd | vd | θ gF | Glass Material | |
|---|---|---|---|---|---|---|---|
| R1 | 38.02319 | 1.2 | 1.92286 | 18.9 | 0.6495 | SNPH2 | OHARA |
| R2 | 23.64121 | 5.09959 | 1.883 | 40.76 | 0.5667 | SLAH58 | OHARA |
| R3 | 131.311 | Variable A | | | | | |
| R4* | 129.1004 | 0.9 | 1.9027 | 31 | 0.5943 | LLAH86 | OHARA |
| R5* | 10.3344 | 4.88861 | | | | | |

TABLE 13-continued

| Face No. | r | d | nd | vd | θ gF | Glass Material | |
|---|---|---|---|---|---|---|---|
| R6 | −42.02758 | 0.8 | 1.883 | 40.76 | 0.5667 | SLAH58 | OHARA |
| R7 | 151.1522 | 0.26076 | | | | | |
| R8 | 23.44141 | 2.75687 | 1.92286 | 18.9 | 0.6495 | SNPH2 | OHARA |
| R9 | −56.19532 | Variable B | | | | | |
| R10 | −21.27546 | 0.8 | 1.804 | 46.57 | 0.5571 | SLAH65 | OHARA |
| R11 | −120.959 | Variable C | | | | | |
| R12 | ∞ | Variable D | | | | | |
| R13* | 17.27228 | 3.25048 | 1.48749 | 70.24 | 0.5300 | SFSL5 | OHARA |
| R14* | −27.00961 | 0.1 | | | | | |
| R15 | 13.69289 | 3.82231 | 1.497 | 81.54 | 0.5375 | SFPL51 | OHARA |
| R16 | −44.0619 | 3.9 | 1.883 | 40.76 | 0.5667 | SLAH58 | OHARA |
| R17 | 12.90406 | Variable E | | | | | |
| R18 | 16.73717 | 6.08 | 1.497 | 81.54 | 0.5375 | SFPL51 | OHARA |
| R19 | −16.18557 | 4.6 | | | | | |
| R20 | −11.24056 | 0.90895 | 1.816 | 46.62 | 0.5568 | SLAH59 | OHARA |
| R21 | −24.74184 | 1.99292 | | | | | |
| R22 | 44.9576 | 1.86249 | 1.51633 | 64.06 | 0.5333 | LBSL7 | OHARA |
| R23* | 367.5265 | Arbitrary | | | | | |
| R24 | ∞ | 2.3 | 1.5168 | 64.2 | | Filters | |
| R25 | ∞ | 1.5 | | | | | |
| R26 | ∞ | 0.7 | 1.5168 | 64.2 | | Cover Glass | |
| R27 | ∞ | | | | | | |

Specific data on the aspheric surfaces of the zoom lens 10 according to the seventh embodiment are as follows.

$4^{th}$ Surface
K=0.000000E+00
A4=5.463350E-05
A6=−1.303180E-06
A8=1.469420E-08
A10=−9.076220E-11
A12=3.143270E-13
A14=−4.884080E-16

$5^{th}$ Surface
K=0.000000E+00
A4=3.368690E-05
A6=−1.005120E-06
A8=−9.216250E-09
A10=1.352820E-10
A12=−3.297500E-13

$13^{th}$ Surface
K=3.301000E-01
A4=−3.253670E-05
A6=1.894420E-07
A8=−1.969370E-09
A10=−8.485160E-12

$14^{th}$ Surface
K=0.000000E+00
A4=2.451920E-05
A6=2.930500E-07
A8=−2.639100E-09
A10=2.487870E-12

$23^{rd}$ Surface
K=0.000000E+00
A4=2.548720E-05
A6=1.876180E-08
A8=−8.213990E-10
A10=6.062930E-12

The following table 14 shows variable amounts among the lenses in question in the table 13.

TABLE 14

| Focal length | 15.99 | 29.5 | 54.41 |
|---|---|---|---|
| Variable A | 0.44 | 5.54 | 16.414 |
| Variable B | 3.316 | 3.28 | 4.737 |
| Variable C | 11.623 | 6.867 | 2.75 |
| Variable D | 4.67 | 1.605 | 1.45 |
| Variable E | 2.891 | 2.353 | 1.65 |

Note that in the seventh embodiment the change in the aperture stop is independent from the fourth lens group IV in zooming.

Figure 14A:
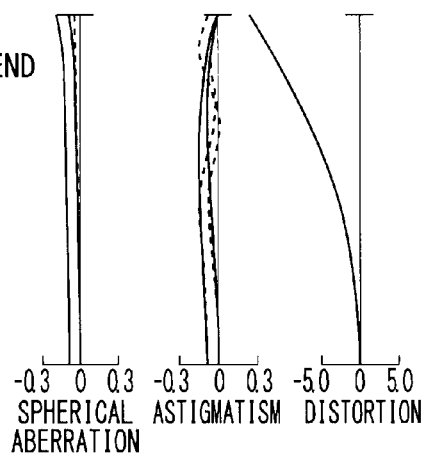
FIGS. 14A to 14C show the aberration curves of the zoom lens according to the seventh embodiment.
Figure 14A:
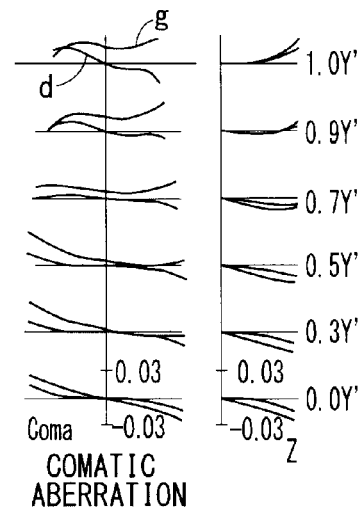
Figure 14B:
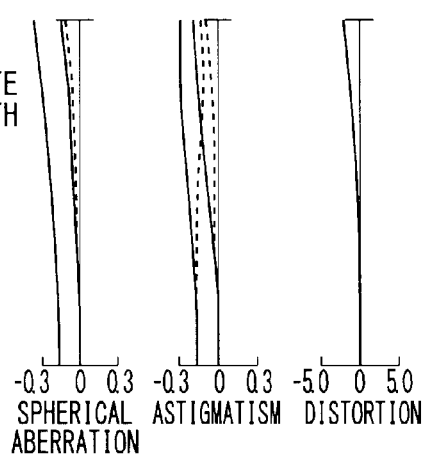
Figure 14B:
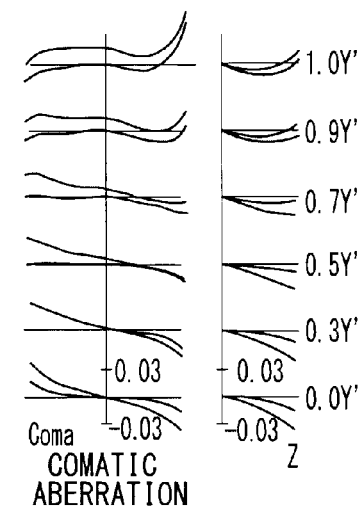
Figure 14C:
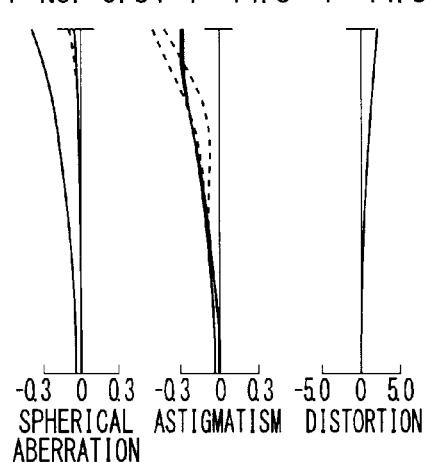
Figure 14C:
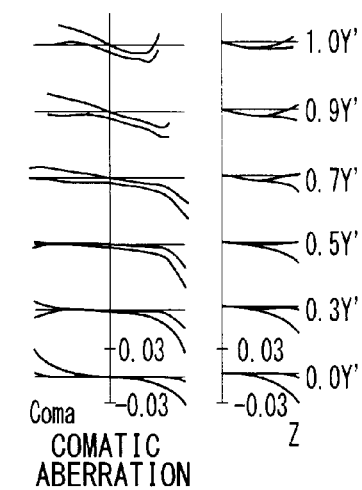

FIGS. 14A to 14C show the aberration curves of the zoom lens 10 according to the seventh embodiment at wide angle end, intermediate focal length, and telephoto end, respectively.

The parameters of the first to third conditions in the first to seventh embodiments are shown in the following table 15.

TABLE 15

| | $1^{st}$ | $2^{nd}$ | $3^{rd}$ | $4^{th}$ | $5^{th}$ | $6^{th}$ | $7^{th}$ |
|---|---|---|---|---|---|---|---|
| $1^{st}$ Condition | 1.606 | 1.614 | 3.359 | 2.583 | 1.904 | 1.356 | 0.984 |
| $2^{nd}$ Condition | 2.420 | 2.848 | 5.491 | 4.265 | 2.632 | 1.499 | 0.901 |
| $3^{rd}$ Condition | 1.476 | 1.191 | 0.959 | 1.591 | 1.299 | 1.354 | 2.101 |

Thus, the zoom lenses 10 according to all the first to seventh embodiments satisfy all the first to third conditions.

The zoom lenses 10 according to all the first to seventh embodiments exert half angle of view of 41 degrees or more and zoom ratio of about 1.9 to 3.4 at wide angle end and can correct aberrations sufficiently. Accordingly, a compact size zoom lens 10 with a resolution corresponding to a high-resolution image sensor can be realized.

Further, in zooming from the wide angle end to the telephoto end, the first lens group I is largely moved to the object side so that the height of light passing through the first lens group I is lowered at the wide angle end. This can prevent an increase in the size of the first lens group I along with a wider lens angle.

Further, the zoom lens 10 according to any of the first to seventh embodiments is configured to allow electrically correctable distortion at the wide angle end. That is, paraxial image height is set to 13 mm at wide angle end and it is electrically corrected to 14.3 mm.

Figure 17:
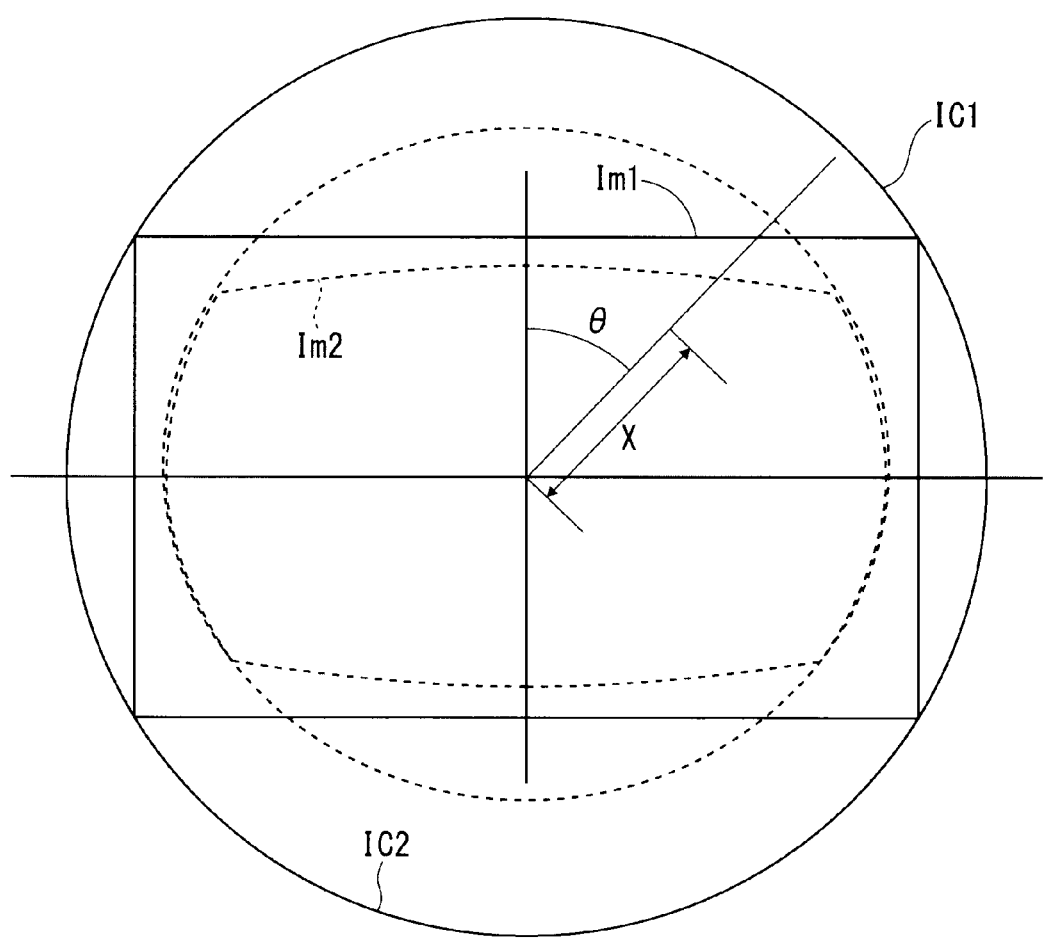
FIG. 17 shows distortion occurring in the zoom lens according to any one of the first to seventh embodiments.

Next, an example of electrical distortion correction is described with reference to FIG. 17. FIG. 17 shows the shape Im1 of a light receiving face of an image sensor which is rectangular, a circumscribed circle IC1 with the shape Im1, and the shape Im2 of image plane near the wide angle end. The circle IC1 is an image circle covering the shape Im1 and an imaging area at the telephoto end and intermediate focal length. The shape Im2 is a barrel shape with negative distortion allowed near the wide angle end and it is drawn with exaggeration for the sake of explanation.

To electrically correct a barrel-shape distortion to the shape Im1, assume a pixel on a straight line making an angle θ with a vertical reference line and at a distance X from the center of the light receiving element. Distortion at the wide angle end can be effectively corrected by converting the pixel position at the distance X to a position on the straight line represented by the expression, 100X/(100+Dis(X)), where Dis(X) [%] is distortion in the distance X.

The ideal image height or the size of the image circle at the intermediate focal length and wide angle end is electrically corrected to the size of a desired image circle, 14.3 mm as (100+Dis(X)/100 times).

By allowing distortion in an electrically correctable range, the degree of freedom in which other types of aberration are corrected and zoom ratio condition can be relaxed so that the zooming lens achieves a large zoom ratio. It can also realize wider angles since the image circle at the intermediate focal length and wide angle end can be reduced in size.

As described above, a compact size, high speed AF zoom lens with less drive power at focusing can be realized owing to the third lens group made of a single negative lens.

Further, the zoom lens satisfying the first condition can exert good optical performance with less aberration in zooming and can be reduced in the total length in use.

Furthermore, compact size, high performance camera device and hand-held data terminal device incorporating such a zoom lens can be realized.

Although the present invention has been described in terms of exemplary embodiments, it is not limited thereto. It should be appreciated that fluctuations may be made in the embodiments described by persons skilled in the art without departing from the scope of the present invention as defined by the following claims.

What is claimed is:

1. A zoom lens comprising:
a first lens group having a positive refractive power;
a second lens group having a negative refractive power;
a third lens group having a negative refractive power and comprised of a single negative lens;
a fourth lens group having a positive refractive power;
a fifth lens group having a positive refractive power, the first to fifth groups being arranged along an optical axis in order from an object side; and
an aperture stop disposed between the third lens group and the fourth lens group, wherein:
the fifth lens group consists of a positive lens and a negative lens;
when zooming from a wide angle end to a telephoto end, the zoom lens is moved so that an interval between the first and second lens groups increases, an interval between the second and third lens groups varies, an interval between the third and fourth lens groups decreases, and the third lens group focuses; and
the second lens group is arranged to have a focal length to satisfy the following condition:

$0.95 < |f2/\sqrt{(fw*ft)}| < 4.0$ where f2 is a focal length of the second lens group, fw is a focal length of the entire zoom lens at the wide angle end and ft is a focal length of the entire zoom lens at the telephoto end.

2. A zoom lens according to claim 1, wherein focal lengths of the second and third lens groups are set to satisfy the following condition:

$0.9 < f2/f3 < 6.0$ where f3 is a focal length of the third lens group.

3. A zoom lens according to claim 1, wherein focal lengths of the first and second lens groups are set to satisfy the following condition:

$0.5 < |f1/f2| < 2.1$ where f1 is focal length of the first lens group.

4. A zoom lens according to claim 1, wherein the aperture stop is moved integrally with the fourth lens group.

5. A zoom lens according to claim 1, wherein when used in a data terminal device including an image sensor to read an image formed by the zoom lens, the zoom lens is configured to allow a distortion in image in a range which is electrically correctable by the image sensor.

6. A camera device comprising the zoom lens according to claim 1 as an optical system.

7. A camera device comprising an image sensor and the zoom lens according to claim 1 as an optical system.

8. A hand-held data terminal device comprising the zoom lens according to claim 1 as an optical system of a camera function.

9. A zoom lens comprising:
a first lens group having a positive refractive power;
a second lens group having a negative refractive power;
a third lens group having a negative refractive power and comprised of a single negative lens;
a fourth lens group having a positive refractive power;
a fifth lens group having a positive refractive power, the first to fifth groups being arranged along an optical axis in order from an object side; and
an aperture stop disposed between the third lens group and the fourth lens group, wherein:
the fifth lens group consists of a positive lens, a negative lens, and another positive lens;
when zooming from a wide angle end to a telephoto end, the zoom lens is moved so that an interval between the first and second lens groups increases, an interval between the second and third lens groups varies, an interval between the third and fourth lens groups decreases, and the third lens group focuses; and
the second lens group is arranged to have a focal length to satisfy the following condition:

$0.95 < |f2/\sqrt{(fw*ft)}| < 4.0$ where f2 is a focal length of the second lens group, fw is a focal length of the entire zoom lens at the wide angle end and ft is a focal length of the entire zoom lens at the telephoto end.

* * * * *